(12) United States Patent
AlKarmi et al.

(10) Patent No.: US 10,321,263 B1
(45) Date of Patent: Jun. 11, 2019

(54) CUSTOMER LOCATION-BASED DELIVERY OF FOOD ITEMS

(71) Applicant: Amazon Technologies, Inc., Seattle, WA (US)

(72) Inventors: Ashraf AlKarmi, Seattle, WA (US); Yenchao Chua, Seattle, WA (US); Edward Hon, Seattle, WA (US); Praveen Krishnan, Redmond, WA (US); Gustavo Eduardo Lopez, Seattle, WA (US); Scott Pardy, Seattle, WA (US); Ruslan Anatolyevich Polyanskiy, Bothell, WA (US); Pawan Lata Uppuluri, Issaquah, WA (US); Evan Weiss, Seattle, WA (US); Gregory Forrest Wright, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/666,952

(22) Filed: Aug. 2, 2017

(51) Int. Cl.
   *G06Q 10/08* (2012.01)
   *G06Q 30/06* (2012.01)
   *H04W 4/021* (2018.01)

(52) U.S. Cl.
   CPC ............ *H04W 4/021* (2013.01); *G06Q 10/08* (2013.01); *G06Q 30/0601* (2013.01)

(58) Field of Classification Search
   CPC ...... G06Q 30/06; G06Q 10/0832; A45C 5/02; A45C 7/00; B32B 5/18
   See application file for complete search history.

(56) References Cited

U.S. PATENT DOCUMENTS

| | | | |
|---|---|---|---|
| 2012/0152963 A1* | 6/2012 | Scott | A45C 5/02 220/592.25 |
| 2014/0058902 A1* | 2/2014 | Taylor | G06Q 30/0635 705/26.81 |
| 2016/0162833 A1* | 6/2016 | Garden | G06Q 50/12 426/231 |
| 2018/0150919 A1* | 5/2018 | Drolet | G06Q 50/12 |

FOREIGN PATENT DOCUMENTS

CN          107323861 A    * 11/2017

* cited by examiner

*Primary Examiner* — Nizar N Sivji
(74) *Attorney, Agent, or Firm* — Lee & Hayes, P.C.

(57) ABSTRACT

A customer may specify, via a mobile device, a current location at which the customer desires to receive a delivery order for food items, as well as a preferred amount of time for the delivery. In response, food items that are available to be delivered to the current location within the preferred amount of time are identified and presented to the customer, including food items to be prepared/provided by merchants and food items current being transported by deliverers within sophisticated food item containers and/or delivery containers. Upon receiving a selection of one or more food items, a delivery of the ordered/selected food items may be facilitated. For instance, one or more instructions to prepare and/or transport the food item(s) may be transmitted to devices of merchants and/or deliverers.

21 Claims, 9 Drawing Sheets

CUSTOMER LOCATION-BASED DELIVERY OF FOOD ITEMS

BACKGROUND

Customers are increasingly placing online orders for various types of items for delivery. For instance, instead of preparing a meal at home, a customer may place an online order for food and/or drink items, where the food/drink items are then delivered to a location associated with the customer (e.g., a residence, a workplace, etc.). However, due to how the food items were prepared by a merchant, the distance between the merchant and a delivery location at which the food items are delivered, an amount of delivery time, and/or the type of container used to transport the food items, the food items may not arrive in their ideal consumption state. For instance, the food items may be too cold, too warm, soggy, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
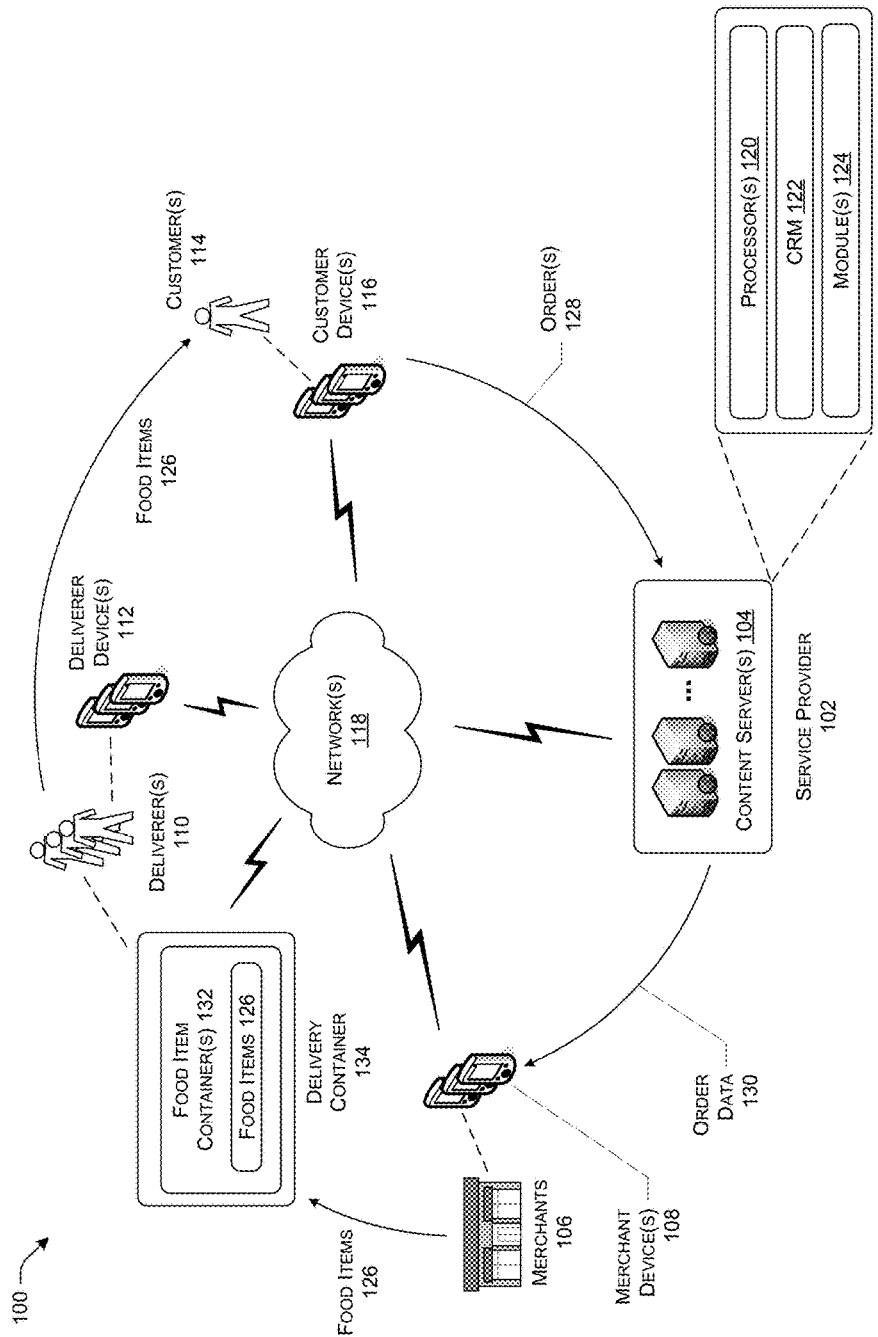
FIG. 1 illustrates an example system for facilitating the delivery of food items to a delivery location associated with a customer that placed a delivery order for the food items.

Described herein are systems and/or processes for facilitating the preparation and delivery of food items using food item containers that are configured to contain the food items and/or delivery containers that are configured to transport the food items/food item containers. In certain embodiments, a service provider, such as an online marketplace, may receive orders for food items on behalf of merchants (i.e., restaurants), where the merchants actually prepare/ provide the food items for delivery to customers. More particularly, a customer that would like to place a delivery order may indicate a current delivery location via a mobile application or website associated with the service provider. For instance, the customer may provide GPS data indicating a current location, an address, a landmark, etc., at which the customer would like one or more food items to be delivered. In response, the service provider may identify and present, via a customer device of the customer, deliverers in proximity to the delivery location that are available to deliver food items, food items that are available for delivery to the current delivery location, and/or estimated delivery times for delivery food items to the current delivery location. Upon receiving a delivery order for one or more food items, the service provider may facilitate the delivery of the ordered food items via intelligent delivery and/or food item containers. In some embodiments, the service provider may cause multiple deliverers to deliver the ordered food items, or may cause different deliverers to exchange or transfer food items with one another in order to facilitate the delivery of the ordered food item(s).

As described herein, the intelligent delivery/food item containers may include one or more sensors that capture sensor data regarding characteristics (e.g., temperature, humidity, pressure, etc.) of the food items and/or an environment within the delivery/food item containers. The delivery/food item containers may also include components that are able to maintain and/or adjust such characteristics. As a result, the service provider may cause the delivery/food item containers to cause the food items included therein to be delivered to the customer in an ideal, expected, or acceptable condition. The service provider may cause the conditions of the food item(s) to be maintained or adjusted based on one or more times in which the food item(s) are expected to be consumed, the particular customer that is to consume the food item(s), and so on. For a particular food item that has been delivered, the sensors of the food item containers may also determine whether portions of the food item have not been consumed (e.g., the customer ate half of the ordered food item). For instance, based on a known weight of the food item, and weight of the food item obtained by one of the sensors, it may be determined that only a portion of the food item was consumed. Based on this information, consumption preferences of the customer may be determined.

In some embodiments, the service provider may identify a particular location at which a significant/threshold amount of customers are likely to be present (e.g., a park, fair, concert venue, etc.). The service provider may cause one or more deliverers to pick up food items from merchants and transport the food items to the location using intelligent delivery/food item containers. The food items may be those that are most frequently ordered by customers from the merchants. The components of the intelligent delivery/food item containers may cause the food items to remain in an optimal condition/state for a longer period of time. Upon determining that the inventory of certain food items is at or below a threshold amount, the service provider may cause the merchants to prepare additional food items, and cause the deliverers to transport those food items to the location. As a result, customers at the location may quickly and efficiently order/pick up food items at the location, without having to place an order with a food truck (and possibly wait in line), and wait for the ordered food items to be prepared. Furthermore, if a location includes different areas (e.g., different terminals within an airport, different areas in a sports stadium, etc.), a merchant located in one area may fulfill orders for food items for customers located in a different area. For instance, a service provider may cause one or more deliverers to pick up food items from the merchant in a first area, and then transport the food items to different areas using the intelligent delivery/food item containers. The intelligent delivery/food item containers may cause the food items to remain in an optimal consumption state while located in the different areas of the location.

The service provider may also collect data regarding the delivery of food items to customers, then determine the performance of merchants and/or deliverers based on such data, and take one or more actions based on the determined performance. In particular, the service provider may determine the performance of deliverers based on delivery time, location data, audio/image/video data, and/or feedback from merchants and/or customers. In other embodiments, the service provider may determine the performance of merchants based on preparation time corresponding to food items, order accuracy data, and/or feedback provided by deliverers and/or customers.

FIG. 1 illustrates an example system 100 for utilizing intelligent food item containers and/or delivery containers to facilitate the preparation and delivery of food items. As shown in FIG. 1, the system 100 may include a service provider 102, a content server 104 associated with the service provider 102, one or more merchants 106, merchant devices 108 associated with the one or more merchants 106, one or more deliverers 110, deliverer devices 112 associated with the one or more deliverers 110, one or more customers 114, and customer devices 116 associated with the customers 114. The content server(s) 104, the merchant devices 108, the deliverer devices 112, and/or the customer devices 116 may communicate via one or more networks 118. As shown herein, the content server(s) 104 may include one or more processors 120, computer-readable media 122 (abbreviated as "CRM" in FIG. 1), and one or more modules 124.

In various embodiments, the service provider 102 may offer items (e.g., products, services, food items 126, etc.) to customers 114 via an electronic marketplace (e.g., a website, a mobile application, etc.) associated with the service provider 102. That is, the customers 114 may access the electronic marketplace via corresponding customer devices 116 for the purpose of searching for, viewing, selecting, acquiring (e.g., purchasing, leasing, renting, borrowing, lending, etc.), etc., items. The items, such as the food items 126, may be provided directly by the service provider 102, or may be provided by the service provider 102 on behalf of a different entity, such as the merchants 106 (e.g., restaurants). That is, via a website, an electronic marketplace, and/or a mobile application associated with the service provider 102, the customers 114 may place orders for food items 126 to be provided by the merchants 106.

Alternatively, customers 114 may place orders directly with the merchants 106, such as via a merchant website, a mobile application associated with a merchant 106, etc. Although the disclosure describes that an order 128 for a food item 126 may be received by the service provider 102 and/or a merchant 106, it is contemplated that an order 128 need not be associated with a food item 126 that is prepared for, and provided to, a customer 114.

For the purpose of this discussion, the service provider 102 may be any entity, server(s), platform, etc., that offers items (e.g., products, services, food items 126, etc.) for acquisition to consumers. For example, the service provider 102 may be associated with an electronic or merchant marketplace (e.g., a website) that allows customers 114 to search, browse, view and/or acquire (i.e., purchase, rent, lease, borrow, etc.) items, such as food items 126, offered for sale directly by the service provider 102 or offered for sale by the service provider 102 on behalf of merchants 106 and/or other entities. In certain embodiments, a customer 114 may place, via the service provider 102, an order 128 for one or more food items 126 (e.g., food, drinks, etc.) that are to be provided by a restaurant merchant 106. As explained in additional detail below, the service provider 102 may facilitate the delivery of the ordered food items 126 to a physical location (also referred to herein as a "delivery location") associated with the customer 114 that placed the order 128.

The merchants 106 may include any entity that provides items (e.g., food items 126) to the customers 114. The items may be offered for sale, lease, rent, etc., via a physical merchant location (e.g., a brick-and-mortar retail store), via a merchant-branded website (and/or a website associated with the service provider 102 or another entity), or via a mobile application that resides on the customer devices 116. In some embodiments, a merchant 106 may correspond to a merchant 106 that need not be situated in a fixed location, and instead may move from a first physical location to a second physical location. For instance, a merchant 106 may be a food truck, a food cart (e.g., a hot dog or ice cream cart/vendor), or any other type of merchant 106 that offers food items 126 at different physical locations at different times. The merchant 106 may provide dine-in services at a physical location at which the merchant 106 is currently situated, take-out services where customers 114 order food items 126, via the merchant 106 or the service provider 102, and pick up the ordered food items 126 at the current physical location of the merchant 106, and/or delivery services where the merchant 106, the service provider 102, or the deliverer(s) 110 deliver the ordered food items 126 to a physical location associated with a customer 114 (e.g., a residence, a workplace, etc.) that placed the order 128 for the food items 126. Moreover, the merchants 106 may be any type of merchant 106 that offers any type of items (e.g., products, services, etc.), such as a grocery store that offers food items 126, a florist that offers flowers, etc. Each merchant 106 may have one or more associated merchant devices 108. In some embodiments, a merchant 106 may be associated with multiple merchant devices 108 such that individual employees or representatives of the merchant 106 may operate a merchant device 108 (e.g., hand held device, tablet, terminal, a point-of-sale (POS) system/device/terminal, a device to receive payment, etc.).

Upon preparing a food item 126 for take-out or delivery, a restaurant merchant 106 may place the food item 126 in a food item container 132. For the purposes of this discussion, the food item container 132 may be any type of container (e.g., a box, a bag, a carton, a plate, a bowl, ajar, etc.) that the food item 126 is placed into by the restaurant merchant 106, or by another entity/individual. That is, the food item container 132 may be any container in which the contents of the food items 126 are in contact with, or are exposed to, an interior surface (e.g., a bottom surface, a side surface or wall, a top surface, a cover, etc.) of the container. The food item container 132 may be made of any type of material, including plastic, cardboard, metal, Styrofoam, and so on. Moreover, the food item container 132 may include a single compartment or multiple compartments. In the latter scenario, the food item container 132 may contain any number of compartments, where each different compartment may include a different food item 126 or ingredient. For instance, the food item container 132 may include a first compartment that contains chicken, a second compartment that contains rice, a third compartment that contains salad, and so on. Moreover, food items 126 included within each food item container 132 may be intended to be picked up by, or delivered to, a single customer 114 or delivery location. The food item container 132 may include one or more components, such as memory, one or more processors, and one or more sensor(s) that capture/obtain sensor data (e.g., temperature data, humidity data, pressure data, acceleration/orientation data, viscosity data, etc.) regarding the food item(s) 126 included within the food item container 132 and/or an environment within the food item container 132. Additional components of the food item container 132 may include one or more communication components that are configured to transmit/receive information (e.g., the sensor data) and/or one or more food item container regulation components that are configured to maintain and/or adjust one or more food item characteristics (e.g., temperature, humidity, pressure, viscosity, acceleration, orientation, etc.) associated with the food item(s) 126 and/or the environment within the food item container 132.

As stated above, as food items 126 are prepared and completed by a merchant 106, the merchant 106 may place the finished food items 126 (or ingredients) into a food item container 132. A deliverer 110 may pick up a food item container 132 that contains the ordered food items 126 from a physical location of the merchant 106 that prepared the food items 126. The deliverer 110 may then physically deliver the ordered food items 126 to a delivery location associated with the customer 114 (e.g., a residence, a workplace, etc.) that placed the order 128 for the food items 126. The deliverer 110 may be a third party, or may be an individual associated with the service provider 102 and/or the merchant 106. The deliverer 110 that is selected to deliver the ordered food items 126 to the customer 114 may be based on a current location of the deliverer 110, an availability of the deliverer 110, a distance between the current location of the deliverer 110 and the current location of the merchant 106, weather conditions (e.g., rain, snow, etc.), traffic conditions, one or more routes that the deliverer 110 could use to travel to the merchant 106 and/or the delivery location of the customer 114, a mode of transportation of the deliverer 110 (e.g., walk, bicycle, car, UAV, etc.), and so on. The deliverer 110 may deliver the food items 126 using any mode of transportation, such as by delivering the food items 126 on foot (e.g., walking, running, skateboarding, etc.), or by using a bicycle or manual scooter, an automobile (e.g., electronic scooter/moped, motorcycle, car, etc.), a bus, a train, and so on. In addition, the deliverer(s) 110 and/or the deliverer device(s) 112 may include unmanned aerial vehicles (UAV) and/or other autonomous vehicles (e.g., a driverless car) that deliver the food items 126 to a physical location associated with the customer 114. Each deliverer 110 may be associated with a corresponding deliverer device 112, such as a laptop computer, a mobile telephone, a tablet computer, etc. Via the deliverer device 112, and possibly via a mobile application that resides on the deliverer device 112 and that is associated with the service provider 102, the deliverer 110 may receive/send various types of information regarding the pick-up and delivery of food items 126, as will be discussed in additional detail herein.

When picking up one or more food item containers 132 that each contain one or more food items 126, the deliverer 110 may place the food item container(s) 132 into a delivery container 134. In other embodiments, the merchant 106 may place one or more food item containers 132 into the delivery container 134. For the purposes of this discussion, the delivery container 134 may be used to transport the food item container(s) 132 that contain the ordered food item(s) 126 to the delivery location of the customer 114. The delivery container 134 may also be used to hold/maintain the food item containers 132 for any period of time. In some embodiments, the delivery container 134 may be any type of transport vehicle/vessel in which one or more food item containers 132 are placed into for delivery/take-out. For instance, the delivery container 134 may be a box, bag, envelope, package, tote, or any other mechanism in which the food item containers 132 may be placed within (e.g., on, underneath, etc.) for delivery to, or take-out by, the customer 114. The delivery container 134 may include/transport one or multiple food item containers 132, and may include a single compartment or multiple compartments that are each configured to store/contain one or more food item containers 132.

In some embodiments, the food item containers 132 and/or the delivery containers 134 may be fungible or disposable, meaning that they are likely thrown away or recycled after one or more uses. Examples of disposable containers may include cardboard/Styrofoam/plastic boxes, paper/plastic bags, and so on. However, in other embodiments, the food item containers 132 and/or the delivery containers 134 may be reusable, and possibly purchased/rented by the merchants 106, the deliverers 110, and/or the customers 114. Reusable containers may be made of plastic, metal, glass, clay, cloth/fabric, or any other material, and may include some or all of the components described above (e.g., sensors, communication components, food item characteristic regulation components, etc.). The food item container(s) 132 and the delivery container(s) 134, as well as the components included therein and the operations/functions that they perform, are further described in U.S. patent application Ser. No. 15/431,446, U.S. patent applicant Ser. No. 15/431,490, and U.S. patent applicant Ser. No. 15/431, 576, which were each filed on Feb. 13, 2017, and which are each incorporated by reference herein in their entirety.

Moreover, the customers 114 may include any person or entity that interacts with the service provider 102 for the purpose of ordering, acquiring, purchasing, etc., food items 126 directly from the merchants 106, and/or from the service provider 102 on behalf of the merchants 106. The customers 114 may include in-store customers 114 that purchase or consume the food items 126 provided by the merchants 106 at the current physical location of the merchants 106, and remote customers 114 that also order food items 126 from the merchants 106 via the service provider 102, but that either pick up the food items 126 from the current physical location of the merchants 106 or have the food items 126 be delivered to a physical location associated with the customers 114. The customers 114 may interact with the service provider 102 and/or the merchants 106 via corresponding customer devices 116, which may include cellular telephones, tablet devices, laptop computers, desktop computers, gaming consoles, electronic book (eBook) reader devices, and so on. In some embodiments, as opposed to the customer 114 being an individual person, the customer 114 may correspond to an entity or group, such as a company, a corporation, an educational institution, a non-profit entity, a religious institution (e.g., a church), an athletic team, and so on.

The network(s) 118 may facilitate communications and/or interactions between the content server(s) 104 of the service provider 102, the merchant devices 108, the deliverer devices 112, the customer devices 116, the food item containers 132, and/or the delivery containers 134. The network(s) 118 may facilitate such communications/interactions via any type of network, such as a public wide-area-network (WAN) (e.g., the Internet), which may utilize various different technologies including wired and wireless technologies. Moreover, the content servers 104 may contain any number of servers that are possibly arranged as a server farm. Other server architectures may also be used to implement the content servers 104.

Moreover, the content server(s) 104, the merchant device(s) 108, the deliverer device(s) 112, and/or the customer device(s) 116 may include one or more processors 120, computer-readable media 122, which is indicated in FIG. 1 as "CRM", and one or more modules 124. The processor(s) 120 may execute the one or more modules 124 and/or processes to cause the content server(s) 104, the merchant device(s) 108, the deliverer device(s) 112, and/or the customer device(s) 116 to perform a variety of functions, as set forth above and explained in further detail in the following disclosure. In some embodiments, the processor(s) 120 may include a central processing unit (CPU), a graphics processing unit (GPU), both CPU and GPU, or other processing units or components known in the art. Additionally, each of the processor(s) 120 may possess its own local memory, which also may store program modules, program data, and/or one or more operating systems.

The computer-readable media 122 may include volatile memory (such as RAM), non-volatile memory (such as ROM, flash memory, miniature hard drive, memory card, or the like), or some combination thereof. The computer-readable media 122 may be non-transitory computer-readable media 122. The computer-readable media 122 may include, or be associated with the one or more modules 124 that perform various operations associated with the content server(s) 104, the merchant device(s) 108, the deliverer device(s) 112, and/or the customer device(s) 116. In some embodiments, the one or more modules 124 may include or be associated with computer-executable instructions that are stored by the computer-readable media 122 and that are executable by the processor(s) 120 to perform such operations. The content server(s) 104, the merchant device(s) 108, the deliverer device(s) 112, and/or the customer device(s) 116 may also include additional components not listed above that may perform any function associated with the content server(s) 104, the merchant device(s) 108, the deliverer device(s) 112, and/or the customer device(s) 116.

The customers 114 may place orders 128 for food items 126 to be provided/prepared by one or more merchants 106 via the service provider 102 (or via the merchant 106 itself), such as via a web site or mobile application associated with the service provider 102, a text message, an e-mail message, and so on. In other embodiments, the customers 114 may place orders 128 for food items 126 to be provided/prepared by the service provider 102 itself. Upon receiving an order 128 from a customer 114, the service provider 102 may provide order data 130 relating to the order 128 to the merchant 106 that is to provide the ordered food items 126. For instance, the order data 130 may be provided to a merchant device 108 (e.g., a tablet computer, a POS system, etc.) of the merchant 106. The order data 130 for an order 128 may allow the merchant 106 to fulfill the order 128, such as by the merchant 106 preparing the food items 126 for pick-up by the customer 114 or for delivery to the customer 114 via one or more deliverers 110. The order data 130 may indicate the specific food item(s) 126 included in the order 128, a price/cost of each food item 126 in the order 128, a total cost/price of the order 128, ingredients/supplies needed to provide/prepare the food item(s) 126, an identity of the customer 114 that placed the order 128, an expected delivery time, and any other information that relates to fulfilling the order 128. For a delivery order 128, the order data 130 may indicate a time at which the food items 126 are to be picked up by a deliverer 110 that is to deliver the food items 126 to the customer 114 and/or an identity of that deliverer 110.

As discussed herein, the food items 126 may include food, drinks, etc. However, the food items 126 may also include any type of perishable items or items in which their respective condition may change over time. Such items may include flowers that may wilt or dry out, candles that may melt, or any other item that tends to remain in its optimal state/condition for a limited period of time. Moreover, for the purposes of this discussion, although the term "food item" is used herein, the items ordered by customers 114 and subsequently delivered by the deliverers 110 may include any type of items, such as food items 126, drink items, and other types of products. A non-exhaustive list of other items/products may include electronic equipment, toys, sports equipment, clothing, bedding items (e.g., blankets, sheets, etc.), furniture, house accessories, and so on.

Figure 2:
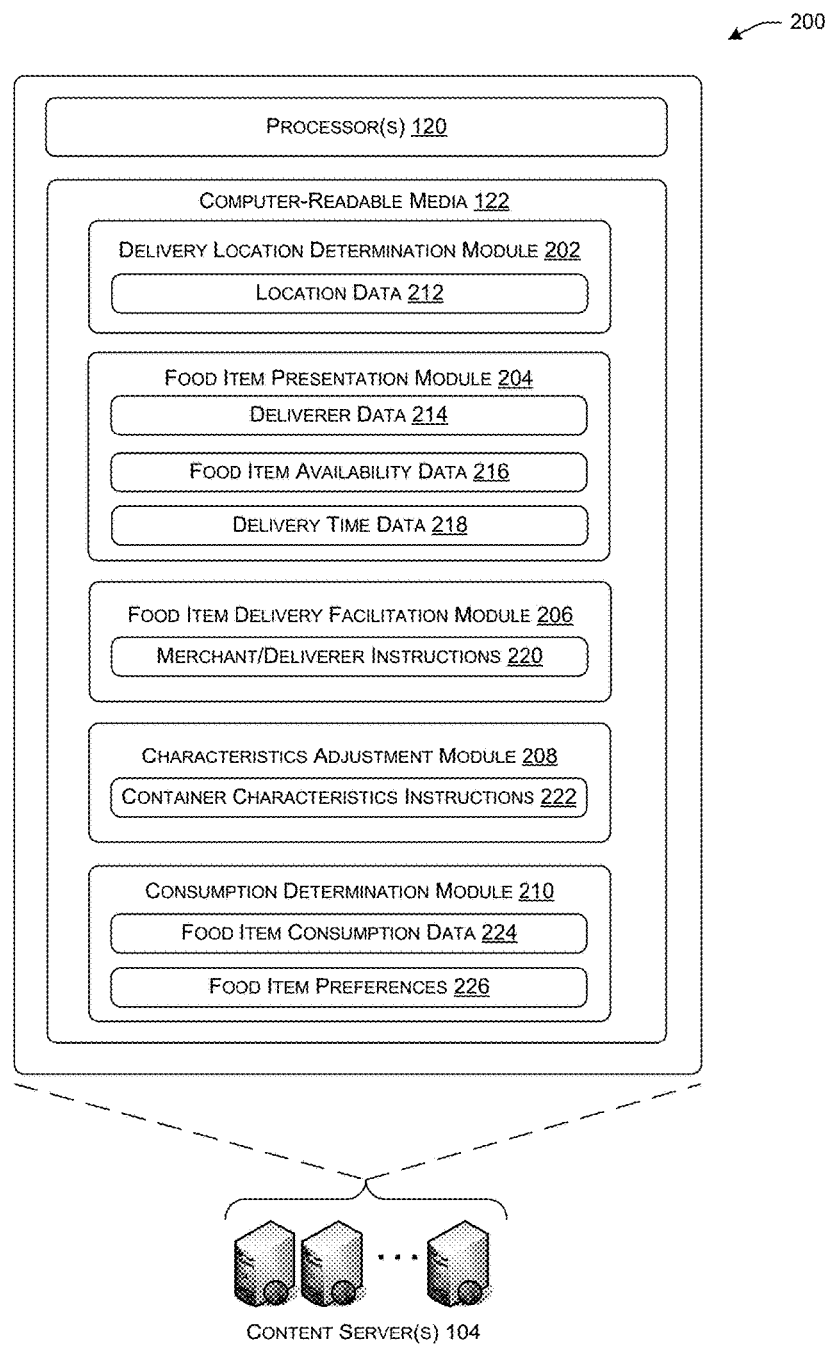
FIG. 2 illustrates an example system for facilitating the delivery of food items to a customer based on a current delivery location of the customer using intelligent delivery/food item containers.

FIG. 2 illustrates an example system 200 directed to the content server(s) associated with the service provider, as discussed with respect to FIG. 1. As shown, the content server(s) 104 may include one or more processors 120, computer-readable media 122, and various modules. Although the content server(s) 104 may include any number and/or type of modules, the modules may include a delivery location determination module 202, a food item presentation module 204, a food item delivery facilitation module 206, a characteristics adjustment module 208, and a consumption determination module 210.

As discussed herein, food items 126 prepared by merchants 106 may be placed in food item containers 132 and/or delivery containers 134. One or more sensors of the food item containers 132 and/or the delivery containers 134 may monitor the conditions/characteristics of the food items 126 (e.g., temperature, humidity, etc.) or the environment within the food item container 132/delivery container 134. The components of the food item container 132/delivery container 134 may also maintain and/or adjust the characteristics within the food item container 132/delivery container 134. For instance, the temperature, humidity, pressure, etc. of the food items 126 contained therein may be maintained so that the food items 126 remain in an ideal consumption state during delivery, or at least arrive at the delivery location in an acceptable consumption state. The temperature, humidity, pressure, etc. of the food items 126 may also be increased/decreased so that the food items 126 remain in an ideal state, are cooked, are thawed, and so on. As a result, by including the food items 126 in the food item container 132/delivery containers 134, the food items 126 may remain therein for longer periods of time without the food items 126 becoming too hot/cold, becoming too moist/dry, spoiling, and so on. The food item containers 132 and/or delivery containers 134 may also impact the delivery of food items 126.

In some instances, a customer 114 would like to place a delivery order 128 for food items 126, where the ordered food items 126 are delivered to a delivery location of the customer 114, such as a residence, a workplace, etc. However, in other instances, a customer 114 would like to receive a delivery order 128 for food items 126 at their current location. For instance, the customer 114 may be hungry and want food items 126 to be quickly delivered to their current location. In this scenario, the delivery location determination module 202 may receive/obtain location data 212 from a customer 114 and determine a current location of the customer 114 based on the location data 212. The location data 212 may be input by the customer 114, such as via a website or mobile application that is accessible via a corresponding customer device 116 and that is associated with the service provider 102. The location data 212 may also be obtained by the service provider 102 provided that the mobile application associated with the service provider 102 is open or active on the customer device 116 of the customer 114. For the purposes of this discussion, the location data 212 may correspond to GPS coordinates, an address, a user-specified location on a map presented via the customer device 116, a landmark (e.g., a park, building, statue, fountain, etc.). For instance, the customer 116 may open the mobile application and either enter an address or specify that the delivery location will be his/her current location.

Upon determining the current/delivery location of the customer 114, the food item presentation module 204 may present various types of information to the customer 114, such as via the web site or the mobile application referenced herein. In particular, the food item presentation module 204 may cause deliverer data 214 to be presented to customers 114. The deliverer data 214 may identify deliverers 110 that are in close proximity to the current/delivery location of the customer 114, such as deliverers 110 that are currently located within a threshold distance (e.g., 1 mile, 5 miles, etc.) of the current/delivery location of the customer 114. The service provider 102 may also identify and present deliverers 110 that are able to deliver food items 126 to the current/delivery location of the customer 114 within a threshold amount of time (e.g., 5 minutes, 10 minutes, etc.). That is, the deliverers 110 that are presented to the customer 114 may be those that have an estimated delivery time that is less than a predetermined amount of time, which may be specified by the customer 114.

The deliverers 110 that are presented to the customer 114 may be identified by name, an identifier, etc., and may be shown as a list, on a map, etc. For each deliverer 110, the deliverer data 214 may include an inventory of food items 126 associated with that deliverer 110, such as the food items 126 that are currently being carried or transported by the deliverers 110 within the food item containers 132 and/or the delivery containers 134. In addition to identifying the food items 126, the deliverer data 214 may indicate the price of each food item 126 and a source of the food item 126, meaning which merchant(s) 106 actually prepared/provided the food items 126. For instance, the deliverer data 214 may indicate that a first deliverer 110 is transporting a cheeseburger and fries and a pepperoni pizza, which can be delivered to the customer's 114 current location in 10 minutes, and a second deliverer 110 that is transporting teriyaki chicken and rice and a bean burrito, which can be delivered to the current location of the customer 114 in 5 minutes. The deliverer data 214 may also indicate an estimated delivery time for each deliverer 110 to deliver the food items 126 to the current/delivery location of the customer 114. As a result, the customer 114 may browse the available deliverers 110 to determine which food items 126 are available to be delivered to his/her current location in a particular amount of time.

Instead of, or in addition to, displaying food items 126 that are currently being transported/carried by deliverers 110, the food item presentation module 204 may provide/present food item availability data 216 to customers 114. More particularly, upon determining the location data 212 for a customer 114, the service provider 102 may determine particular food items 126 that are available to be delivered to the current/delivery location of the customer 114 within a specified amount of time. In some embodiments, the customer 114 may specify a maximum amount of time in which the customer 114 is willing to wait for the delivery of food items 126. The food item availability data 216 may be presented to the customer 114 via the web site and/or mobile application associated with the service provider 102, and may identify food items 126 that are available to be ordered and delivered to the current/delivery location of the customer 114, the merchants 106 that are to provide/prepare those available food items 126, the price, and so on. As a result, based on the current/delivery location of the customer 114, the service provider 102 may determine and present individual food items 126 that are available to be ordered for delivery. Such food items 126 may be picked up by deliverers 110 from merchants 106, or may be currently transported/carried by certain deliverers 110 that are in proximity to the current location of the customer 114.

The food item presentation module 204 may also determine and present delivery time data 218 to the customer 114. For instance, in response to determining the current/delivery location of the customer 114, the service provider 102 may determine food items 126 that may be delivered to the current/delivery location within a threshold amount of time (e.g., 5 minutes, 20 minutes, etc.). For instance, the service provider 102 may determine and present (e.g., visually via a display, audibly via one or more speakers, etc.) first food items 126 that are available to be delivered within 10 minutes, second food items 126 that are available to be delivered within 15 minutes, third food items 126 that are available to be delivered within 30 minutes, and so on. The customer 114 may indicate the threshold amount of time via the web site/mobile application, such as by stating that the customer 114 would like a delivery time of less than 15 minutes for the delivery of food items 126. The service provider 102 may then present various food item delivery options to the customer 114. Such options may include food items 126 currently being transported by a deliverer 110 that could be delivered within the maximum delivery time. The options may also include food items 126 that could be prepared by a merchant 106, picked up by a deliverer 110, and then delivered to the current/delivery location of the customer 114 within the maximum delivery time. That is, along with the location data 212, the service provider 102 may determine a preferred amount of time for the delivery of food items 126. The preferred amount of time may be specified/provided by the customer 114 (e.g., 10 minutes, 30 minutes, etc.) and/or may be based on preferences of the service provider 102, the merchant(s) 106 that are preparing/providing the food item(s) 126, and/or the type of food item(s) 126 to be delivered. For instance, it may be preferred that certain food items 126 be delivered quicker than other food items 126.

In some embodiments, the customer 114 may not specify the particular food items 126 that he/she would like delivered, and may instead state "I am hungry" or "I want lunch for two in 15 minutes," or something along those lines.

When the customer 114 does not indicate a specific food item 126 to be ordered, the service provider 102 may determine food items 126 for delivery based on explicit and/or inferred preferences of the customer 114. For instance, explicit preferences may indicate that the customer 114 does, or does not, like or prefer a certain food item 126 or ingredient (e.g., broccoli, cheeseburgers, etc.) or category of food items 126 (e.g., soup, Mexican food, desserts, etc.). Preferences of the customer 114 may also be inferred on customer feedback for past orders 128, particular food items 126 previously ordered by the customer 114, and/or particular merchants 106 in which the customer 114 previously ordered food items 126 from. Based on the determined preferences of the customer 114, the service provider 102 may cause a merchant 106 and/or a deliverer 110 to prepare and deliver food items 126 that are likely to be of interest to the customer 114 in a relatively short amount of time.

As stated above, in some embodiments, the customer 114 may specify an amount of time in which he/she would like to receive one or more food items 126. Based on the amount of time specified by the customer 114, the service provider 102 may determine and present/output/display one or more food items 126 that are available to be delivered to the delivery location within the specified amount of time. For whatever reason, the customer may update the amount of time for delivery (e.g., a second amount of time), such as by changing the amount of time from 15 minutes to 10 minutes. The service provider 102 may then determine updated food items 126 that are available to be delivered to the delivery location within the second amount of time, and then present those food items 126 (e.g., second food items 126) to the customer 114. As a result, the food items 126 presented to the customer 114 may be updated in real-time (or near real-time) based on the amount of time in which delivery of food items 126 is preferred or desired.

Accordingly, at any time, a customer 114 may, via the web site or mobile application, indicate that he/she would like food items 126 to be delivered to his/her current location (e.g., an address, GPS location, a landmark, etc.) within a certain amount of time (e.g., 15 minutes). The service provider 102 may then determine which food items 126 are available to be delivered within that specified amount of time, and present delivery options to the customer 114. Upon the customer 114 selecting one or more food items 126 and placing a delivery order 128 for those food items 126, the food item delivery facilitation module 206 may facilitate the delivery of the ordered food items 126 to the current/delivery location of the customer 114, such as via the intelligent/sophisticated food item containers 132/delivery containers 134. To facilitate the delivery of the ordered food items 126, the food item delivery facilitation module 206 may transmit merchant/deliverer instructions 220 to a merchant 106 that is to prepare/provide the ordered food item(s) 126 and/or one or more deliverers 110 that are to deliver the ordered food item(s) 126 to the current/delivery location of the customer 114. The merchant/deliverer instructions 220 may include a text message, an e-mail message, a notification via a mobile application that reside on merchant devices 108 and/or deliverer devices 112 and that are associated with the service provider 102, a telephone call, and so on.

Provided that the food item(s) 126 ordered by the customer 114 have yet to be prepared, the service provider 102 may send an instruction to a merchant device 108 of the merchant 106 that is to prepare the ordered food item(s) 126. The service provider 102 may also send, to one or more deliverer devices 112, an instruction to one or more deliverers 110 that are to pick up the ordered food item(s) 126 from the physical location of the merchant 106 (e.g., a restaurant, a current location of a food truck) and then transport the ordered food item(s) 126 from the physical location of the merchant 106 to the current/delivery location of the customer 114. However, provided that the food item(s) 126 ordered by the customer 114 are currently being transported/carried by one or more deliverers 110, the service provider 102 may send an instruction to such deliverers 110 regarding the delivery of the ordered food item(s) 126. That is, the service provider 102 may send an instruction to one or more deliverer devices 112 of the one or more deliverers 110, where the instruction may instruct the deliverer(s) 110 to deliver the food item(s) 126 to the current/delivery location of the customer 114. The instructions to the deliverer 110 may also identify the customer 114, indicate the customer's 114 current location, include contact information (e.g., a telephone number, an e-mail address, etc.) for the customer 114, and so on, such that the one or more deliverers 110 are able to correctly identify the customer 114 when the deliverer(s) 110 arrive at the current/delivery location.

In some embodiments, the customer 114 may order food items 126 from multiple merchants 106. For instance, the customer 114 may order a first food item 126 from a first merchant 106 (e.g., a cheeseburger from Bob's Burgers) and a second food item 126 from a second merchant 106 (e.g., a side salad from the Salad Hut). In response, the service provider 102 may instruct a single deliverer 110 to pick up the first food item 126 from a first location of the first merchant 106 and the second food item 126 from a second location of the second merchant 106, and then deliver both food items 126 to the current/delivery location of the customer 114. The service provider 102 may cause a single deliverer 110 to pick up and deliver both food items 126 provided that the single deliverer 110 is able to deliver the food items 126 within the amount of time specified by the customer 114 or determined by the service provider 102. Otherwise, the service provider 102 may transmit multiple instructions—a first instruction to a first deliverer 110 to pick up and deliver the first food item 126 to the current/delivery location of the customer 114 and a second instruction to a second deliverer 110 to pick up and deliver the second food items 126 to the current/delivery location of the customer 114. As a result, the customer 114 may receive multiple deliveries for the ordered food items 126, but may still receive both food items 126 in the specified amount of time. However, in some embodiments, although multiple deliverers 110 pick up the ordered food items 126 from multiple merchants 106, the service provider 102 may instruct the deliverers 110 to meet at a location such that a single one of the deliverers 110 delivers all of the ordered food items 126 to the current/delivery location of the customer 114.

In other embodiments, the customer 114 may order food items 126 that are being transported by multiple deliverers 110. For instance, the customer 114 may place an order for multiple food items 126—a first food item 126 being transported by a first deliverer 110 and a second food item 126 being transported by a second deliverer 110. Such food items 126 may be maintained in an intelligent food item container 132 and/or delivery container 134 that is configured to maintain and/or adjust the characteristics of the food items 126. In this scenario, the service provider 102 may instruct each deliverer 110 to deliver the ordered food item 126 that they are carrying to the current/delivery location of the customer 114. In other embodiments, the service provider 102 may instruct the deliverers 110 to meet at a location (specified by the service provider 102 or agreed upon by the deliverers 110) such that one of the two deliverers 110 delivers each of the ordered food items 126. For instance, the first deliverer 110 may travel to the current location of the second deliverer 110 to pick up one of the ordered food items 126, and vice versa. Upon meeting, the deliverers 110 may swap/exchange food items 126, transfer food items 126, and so on. A deliverer 110 may also deliver a first food item 126 that is picked up from a merchant 106, as well as a second food item 126 that is currently being carried/transported by the deliverer 110.

By keeping food items 126 in intelligent food item containers 132 and/or delivery containers 134, the characteristics of the food items 126 (e.g., temperature, humidity, etc.) may be maintained and/or adjusted, thereby allowing the service provider 102 to keep the food items 126 in an optimal consumption condition for longer periods of time. This may also allow the service provider 102 to increase the variety of food items 126 that are available to customers 114. For instance, deliverers 110 may keep prepared food items 126 for longer period of times in the food item containers 132 and/or delivery containers 134, which may allow customers 114 to order food items 126 that are being transported by deliverers 110 and may allow the deliverers 110 to quickly deliver the ordered food items 126 to the customers 114. The selection of food items 126 available to customers 114 may also be expanded due to the introduction of food items 126 provided by merchants 106 that typically do not offer delivery services to customers 114 that are not in close proximity to the merchants 106. Since the food items 126 may be maintained in the food item containers 132 and/or delivery containers 134 for longer periods of time, a merchant 106 may provide food items 126 for delivery to customers 114 that are further away from the merchant 106. As a result, due to the food item containers 132 and/or the delivery containers 134, customers 114 may place delivery orders 128 for food items 126 prepared by such merchants 106.

In some embodiments, the customer 114 may not consume the ordered food items 126 immediately after they are delivered to the current/delivery location of the customer 114. The customer 114 may take the ordered food items 126 to a residence or workplace, wait for others to arrive, etc., and therefore consume the ordered food items 126 at a later time. The food item containers 132 and/or the delivery containers 134 may include adjustable components (e.g., buttons, knobs, a touch-sensitive user interface, etc.) that allow the customer 114 to adjust the characteristics (e.g., temperature) of the environment within the food item container 132/delivery container 134. That way, the customer 114 may cause the food items 126 to remain in an optimal or acceptable consumption state for longer periods of time. For instance, if the customer 114 elects to consume the food items 126 at a later time (e.g., the customer 114 gets distracted, the plans of the customer 114 change, etc.), the customer 114 may adjust the conditions/characteristics of the ordered food items 126. As an illustrative example, the customer 114 may increase the heat for food items 126 that are intended to be consumed when hot/warm (e.g., soup, a burrito, etc.), or decrease the temperature for food items 126 that are intended to be consumed when cool/cold (e.g., ice cream, a salad, etc.). The customer 114 then can make his/her own decision as to when to consume the ordered food items 126 after they are delivered.

The service provider 102 may also maintain and/or adjust the conditions or characteristics of the ordered food items 126 based on input from the customer 114. For instance, when placing the delivery order 128, the customer 114 may indicate that he/she will be consuming the food items 126 at a later time (e.g., food items 126 expected to be eaten at 6 pm), or that the food items 126 are likely to be consumed at different times by different individuals (e.g., I will eat when the food items 126 are delivered, my husband will eat later when he gets home from work). As a result, the characteristics adjustment module 208 may cause the food item containers 132 and/or the delivery containers 134 that are transporting the food items 126 to maintain the food items 126 in an optimal consumption state based on the customer 114 input (i.e., container characteristics instructions 222). For instance, the service provider 102 may cause the food item containers 132/delivery containers 134 to maintain the ordered food items 126 at a certain temperature until a certain time or for a duration of time, or the food items 126 may be kept extra hot if they are likely to be consumed a period of time after delivery. For food items 126 that are likely to be consumed at different times, the food items 126 may be placed within separate compartments of the same food item container 132/delivery container 134 such that the characteristics of the food items 126 can be maintained at different levels/states. Or, the food items 126 may be split between different food item containers 132/delivery containers 134 so that the food items 126 will be in their optimal condition when they are consumed at different times (e.g., upon delivery and 2 hours later). In some embodiments, the characteristics within the food item containers 132/delivery containers 134 may be adjusted based on sensor data that is obtained by sensors associated with the food item containers 132/delivery containers 134.

In various embodiments, the consumption determination module 210 may determine food item consumption data 224 and then determine food item preferences 226 for customers 114 based on the food item consumption data 224. In particular, the food item containers 132 and/or the delivery containers 134 may include one or more sensors that obtain sensor data indicating a volume or weight of the food items 126 contained therein. A weight sensor (e.g. a scale) may determine the weight of a food item 126 that is contained in a food item container 132 that is to be delivered to a customer 114. As a result, the overall/initial weight of the food item 126 prior to consumption may be determined. After the food item 126 within the food item container 132 is delivered to the delivery location of the customer 114, the customer 114 will likely consume at least a portion of the food item 126. In some instances, the customer 114 will not consume the entirety of the food item 126. The sensors of the food item container 132 may determine the weight of the food item 126 remaining in the food item container 132 and transmit such sensor data to the service provider 102 (or any other device). The service provider 102 may determine that the customer 114 is finished eating if the weight data associated with the food item 126 remains the same for a certain duration of time (e.g., 5 minutes, 10 minutes, etc.). Accordingly, based on the initial weight of the food item 126 and the weight of the food item 126 after the customer 114 is likely done eating, the difference between the two weight measurements may indicate the amount of the food item 126 that is remaining. The remaining portion of the food item 126 may be discarded by the customer 114 or may serve as leftovers to be consumed at a later time. Temperature data obtained by one or more temperature sensors of the food item container 132 may indicate that the food items 126 were likely placed in a refrigerator (e.g., a temperature of between 35-40 degrees Fahrenheit), which may indicate that the customer 114 kept the remaining portion of the food item 126 as leftovers to be consumed at a later time. Moreover, sensor data obtained by an orientation sensor (e.g., a gyroscope) may indicate that the food items 126 and the food item containers 132 was discarded. The data that represents the amount of the food item 126 remaining after consumption may be referred to as the food item consumption data 224.

Based on the food item consumption data 224, various food item preferences 226 about the customer 114 may be inferred. In particular, if a customer 114 frequently consumes only a portion of food items 126, the service provider 102 may infer that the customer 114 typically orders more than he/she needs, and prefers to have leftovers. On the other hand, if the customer 114 frequently does not consume most or all of the ordered food items 126, the service provider 102 may determine that the size of the portions are too large for the customer 114. Based on the food item preferences 226, and upon receiving a subsequent deliver order 128 from the customer 114, the service provider 102 may provide instructions to the merchant 106 that is preparing/providing the ordered food items 126. For instance, if it is determined that the customer 114 likely prefers having leftovers, the service provider 102 may instruct the merchant 106 to include a larger portion of one or more food items 126. On the other hand, if it is determined that the portion sizes for the customer 114 are typically too large, the service provider 102 may instruct the merchant 106 to reduce the size of the portions. The service provider 102 may also leverage the food item preferences 226 to provide recommendations to the customer 114 regarding the appropriate quantity/portion size of food items 126 to be ordered by the customer 114.

Figure 3:
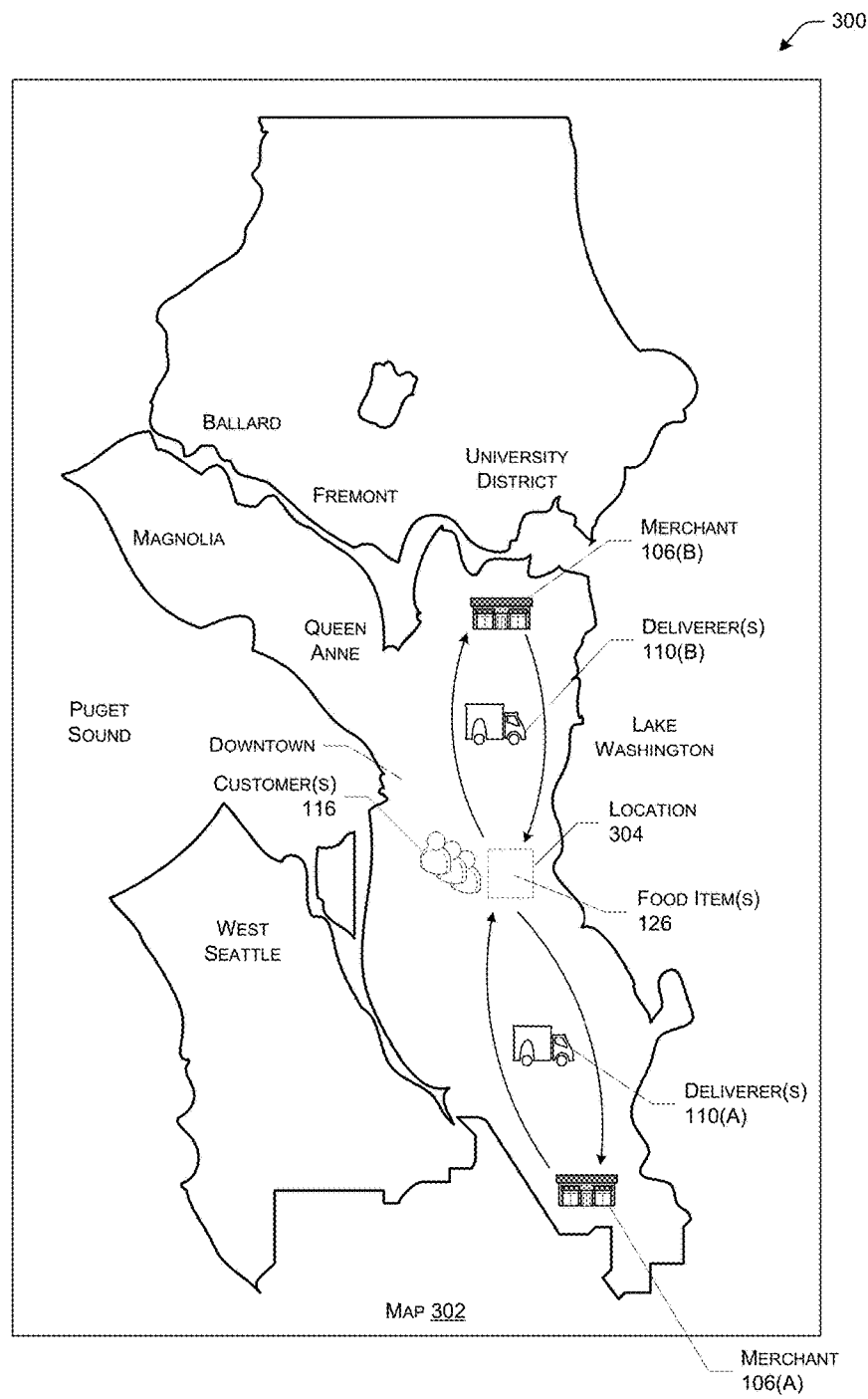
FIG. 3 illustrates an example system for facilitating the offering of food items at a location that is remote from merchants that provide the food items using intelligent delivery/food item containers.

FIG. 3 illustrates an example system 300 for facilitating the offering of food items at a location that is remote from merchants that provide the food items using intelligent delivery/food item containers. Food trucks that offer food items 126 to customers 114 at different locations have become increasingly popular and commonplace. A food truck may be present at a first location on a first day, a second location on a second day, and may also move between locations based on customer demand. However, regardless of where the food truck is located, customers 114 frequently have to wait in line to place an order 128 for a food item 126. Upon placing the order 128, the customer 114 also will have to wait a period of time for the food truck to prepare the food item(s) 126. The amount of time spent waiting to place an order 128 and the amount of time waiting for the food truck to prepare ordered food items 126 is exacerbated at locations in which a large number of customers 114 is present, such as at fairs, stadiums, concert venues, breweries, and so on.

As shown, the system 300 may include a map 302 of a city, area, region, etc., such as the city of Seattle, Wash. The map 302 may depict a location 304, customers 114 located at, or in proximity to, the location 304, one or more merchants 106, and one or more deliverers 110. For the purposes of this discussion, the location 304 may correspond to a geographic location in which customers 114 (e.g., a threshold number/amount of customers 114) that are likely to desire and order food items 126 are present, such as a park, a festival, a fair, a concert venue, a stadium, a parade, and so on. Merchants 106, such as merchant 106(a) and merchant 106(b) may be located remotely from the location 304. Since customers 114 may desire food items 126 provided by those merchants 106, and the merchants 106 may desire to offer food items 126 to those customers 114, the service provider 102 may cause one or more deliverers 110, such as deliverer 110(a) and deliverer 110(b), to transport food items 126 provided/prepared by the merchants 106 from the location of the merchants 106 to the location 304. For instance, deliverer(s) 110(a) may transport first food items 126 provided/prepared by merchant 106(a) to the location 304 and deliverers 110(b) may transport second food items 126 provided/prepared by merchant 106(b) to the location 304. In these embodiments, the food items 126 may be transported by the deliverers 110 using the intelligent food item containers 132 and/or delivery containers 134 described herein that are capable of, and are configured to, maintain and/or adjust the characteristics of the food items 126 while the food items 126 are being transported such that the food items 126 remain in an optimal consumption state.

The food items 126 selected to be placed in the food item containers 132 and/or the delivery containers 134 and transported to the location 304 may be those food items 126 that the service provider 102 and/or the merchants 106 expect customers 114 to like/desire. For instance, the food items 126 may be those that have historically been ordered more frequently than others, which may be based on past orders 128 received by the service provider 102 and/or the merchants 106. The food items 126 may also be selected based on merchant input, preferences of customers 114, as well as specific requests for food items 126 from customers 114.

Upon arriving at the location 304, the food items 126 may be maintained in the food item containers 132 and/or the delivery containers 134 until they are purchased by a customer 114. A customer 114 may order the food items 126 via a web site and/or mobile application associated with the service provider 102 and/or the merchant 106 that provided/prepared the food items 126 (or in person using cash, a credit card, etc.), and pick up the food item(s) 126 at the location 304. Upon a customer 114 placing an order 128, the service provider 102 may send an instruction/notification to the customer 114 (e.g., via the mobile application, an e-mail message, a text message, etc.) to pick up the ordered food item 126. The food items 126 may be organized based on the merchant 106 that provided the food items 126, the type of food items 126, or in any other manner. As a result, customers 114 located at the location 304 may simply go to where the food items 126/food item containers 132 are located and grab a food item 126 of their choosing. In contrast to the food truck example described above, the customers 114 at the location 304 need not wait to place an order 128 for food items 126. Moreover, since the food items 126 contained in the food item containers 132 are ready for consumption, the customers 114 need not wait for the food items 126 to be prepared. That is, there is little to no latency with respect to ordering and obtaining food items 126 at the location 304.

As illustrated in FIG. 3, one or more deliverers 110(a) may pick up and transport food items 126 from merchant 106(a) to the location 304, and one or more deliverers 110(b) may pick up and transport food items 126 from merchant 106(b) to the location 304. The deliverers 110(a) may be the same as, or may be different from, the deliverers 110(b). Upon determining the location 304 in which food items 126 are to be transported to via the food item containers 132 and/or the delivery containers 134, the service provider 102 may transmit instructions to the merchants 106, such as merchant 106(a) and merchant 106(b), to prepare/provide food items 126 that are to be picked up by one or more deliverers 110, such as deliverers 110(a) and deliverers 110(b). The service provider 102 may also instruct the deliverers 110 (e.g., deliverers 110(a) and 110(b)) to pick up the food items 126 from the merchants 106 and transport the food items 126 to the location 304 using the food item containers 132 and/or the delivery containers 134. In some embodiments, deliverers 110 may transport food items 126 from a merchant 106 to the location 304, and then return to the merchant 106 (or a different merchant 106) in order to transport additional food items 126 to the location 304.

As a result, the service provider 102 may determine the particular food items 126 that are transported to the location 304, the quantity of those food items 126, and the source of those food items 126 (e.g., the merchant(s) 106 that prepared the food items 126). The service provider 102 may also determine when customers 114 at the location 304 order, pick up, take, etc., the food items 126 located at the location 304. For instance, if customers 114 order the food items 126 via a web site or mobile application associated with the service provider 102 for pick up at the location 304, the service provider 102 may be aware of which particular food items 126 have been acquired by customers 114 at the location 304. An individual associated with the service provider 102 that is located at the location 304 may facilitate the ordering and pick-up of food items 126 by customers 114 at the location 304. For example, via a mobile device (e.g., mobile telephone, tablet device, etc.) or mobile application associated with the service provider 102, the individual may indicate which food items 126 are being ordered/taken by customers 114, and/or customers 114 may indicate which food items 126 they are ordering/taking via a mobile device/mobile application. In the latter scenario, the customers 114 may indicate their identity and which food items 126 they are taking via the mobile device/mobile application so that the customers 114 are billed appropriately. Sensors associated with the food item containers 132 and/or delivery containers 134 may also obtain sensor data indicating that a food item container 132/delivery container 134 has been moved, opened, etc. Since the service provider 102 may track which food items 126 are contained in which food item containers 132/delivery containers 134, the service provider 102 may determine which food items 126 have been taken by customers 114.

Since the service provider 102 is aware of which food items 126 are transported to the location 304, and which food items 126 have been ordered/picked up at the location 304, the service provider 102 may determine the current inventory of food items 126 at the location 304. If the food items 126, or a particular type of food item 126, is running low (at or below a threshold number or amount), the service provider 102 may instruct one or more merchants 106 to prepare/provide additional instances of that food item 126 and instruct one or more deliverers 110 to transport those food items 126 to the location 304. In other embodiments, the deliverers 110 may already be transporting such food items 126 and, since the service provider 102 is aware of the inventory of food items 126 being carried by each deliverer 110, the service provider 102 may instruct the deliverer(s) 110 to deliver those food items 126 to the location 304. The service provider 102 may instruct the merchants 106 and/or the deliverers 110 to prepare and/or transport the food items 126 for the location 304 in response to determining that the number of food items 126 at the location 304 is at or below a threshold amount/number. For instance, the service provider 102 may determine that the total number of food items 126 is at or below a threshold (e.g., 20 food items 126), or that the number of a particular type of food item 126 (e.g., bean burritos) is at or below a threshold amount (e.g., 10 bean burritos). As a result, the food items 126 at the location 304 may be replenished in real-time, or near real-time. In certain embodiments, the service provider 102 may cause deliverers 110 (e.g., a truck, a food truck, etc.) to maintain food items 126 that are to be subsequently transported to the location 304 in food item containers 132 and/or delivery containers 134. When the inventory of food items 126 or a particular food item 126 at the location 304 is running low (e.g., at or below a threshold amount), the service provider 102 may instruct such deliverers 110 to transport the food items 126 to the location 304. As a result, the service provider 102 may ensure that an adequate amount of food items 126 will remain located at the location 304.

Figure 4:
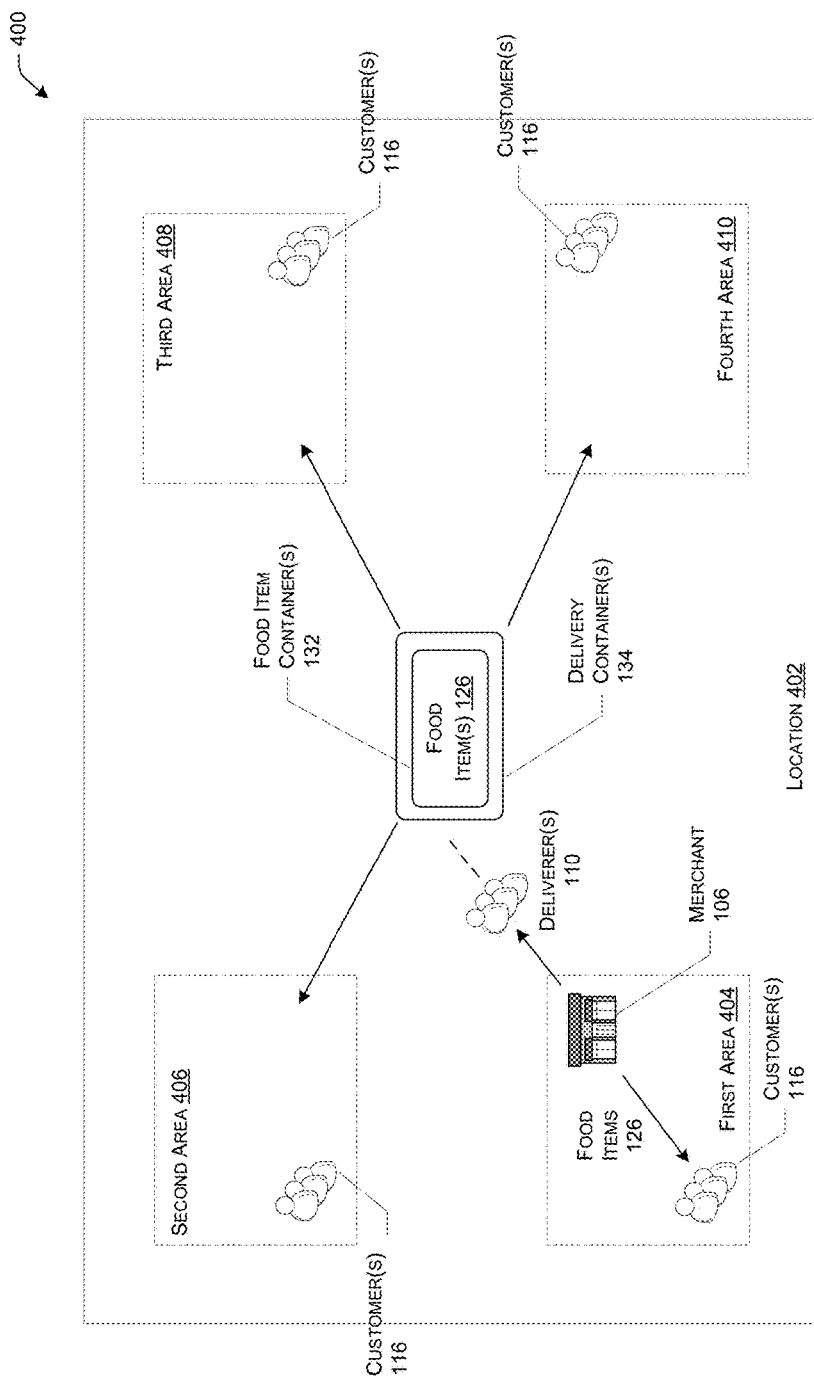
FIG. 4 illustrates an example system for facilitating the offering of food items in different areas of a location at which the merchant that provides the food items is not present using intelligent delivery/food item containers.

FIG. 4 illustrates an example system 400 for facilitating the offering of food items in different areas of a location at which the merchant that provides the food items is not present using intelligent food item containers and/or delivery containers. As illustrated in FIG. 4, the system 400 may include a location 402 and multiple areas within that location 402, such as a first area 404, a second area 406, a third area 408, and fourth area 410. Although four areas are illustrated in FIG. 4, any number of areas may be present within the location 402.

In some embodiments, the location 402 may correspond to location 304 discussed above with respect to FIG. 3. As a result, the location 402, nor any areas within the location 402, may include a merchant 106. In other embodiments, at least one area within the location 402 may include at least one merchant 106 that offers food items 126 for acquisition. For instance, the first area 404 may include a merchant 106. One or more of the areas may also include customers 114 that may desire to acquire the food items 126 prepared/provided by the merchant 106. Such customers 114 may be located in the area at which the merchant 106 is located (e.g., the first area 404), or may be located in a different area at which the merchant 106 is not present (e.g., the second area 406, the third area 408, and the fourth area 410). Accordingly, at least some of the customers 114 may be remote from the location of the merchant 106. For the purposes of this discussion, customers 114 located in the same area as the merchant 106 may be referred to herein as "local customers 114," and customers 114 that are located in an area that is different than the area of the merchant 106 may be referred to herein as "remote customers 114."

Upon the merchant 106 preparing/providing food items 126, the merchant 106 may offer the food items 126 to the local customers 114. For instance, the local customers 114 may arrive at the location of the merchant 106 and order, purchase, and receive the food items 126 for consumption or take-out. However, the service provider 102 and/or the merchant 106 may wish to offer the food items 126 to the remote customers 114 as well. As a result, the service provider 102 and/or the merchant 106 may cause one or more deliverers 110 to pick up the food items 126 at the first area 404, and then deliver the food items 126 to the second area 406, the third area 408, and/or the fourth area 410. For instance, the service provider 102 may transmit instructions to deliverer devices 112 of deliverers 110 instructing the deliverers 110 to transport the food items 126 from the location of the merchant 106 in the first area 404 to one or more different areas. The deliverers 110 may transport the food items 126 using the intelligent/sophisticated food item containers 132 and/or the delivery containers 134 that are configured to monitor, maintain, and/or adjust the conditions or characteristics of the food items 126 and/or the environment in which the food items 126 are contained. As a result, the food items 126 may remain in an optimal or acceptable consumption state during transport such that the food items 126 are ready to be consumed once delivered to one of the different areas.

The service provider 102 may identify customers 114 located in the other areas (e.g., the second area 406, the third area 408, the fourth area 410, etc.) based on one or more mobile applications residing on customer devices 116 of the customers 114. For instance, provided that a mobile application is associated with the service provider 102, the service provider 102 may determine when the mobile application is open or active on the customer devices 116. The service provider 102 may also determine when customers 114 are interacting with the mobile application via their customer devices 116. In addition, the service provider 102 may determine a current location of customer devices 116 when the mobile application residing thereon is open, active, in use, etc. Accordingly, the service provider 102 may identify where customers 114 are located, and may therefore determine when customers 114 are located in one of the other areas illustrated in FIG. 4. Based on preferences, interests, and/or prior orders 128 of those customers, and/or if the mobile application is related to food items 126 and/or merchants 106, the service provider 102 may also determine that the customers 114 are likely to be interested in purchasing food items 126 prepared/provided by merchants 106, such as the merchant 106 illustrated in FIG. 4.

In some embodiments, using a mobile application/website associated with the service provider 102 and/or the merchant 106, a remote customer 114, such as a customer 114 located in the second area 406, the third area 408, or the fourth area 410, may place an order 128 for one or more food items 126 to be prepared/provided by the merchant 106. Instead of traveling to the location of the merchant 106 in the first area 404, the remote customer 114 may instead prefer that the ordered food item(s) 126 be delivered to the area at which the remote customer 114 is located. If the order 128 was placed with the service provider 102, the service provider 102 may send instructions to the merchant 106 instructing the merchant 106 to prepare/provide the ordered food item(s) 126. If the order 128 is placed with the merchant 106, the merchant 106 may begin to prepare the ordered food item(s) 126. The service provider 102 and/or the merchant 106 may then instruct one or more deliverers 110 to pick up the ordered food item(s) 126 from the location of the merchant 106 in the first area 404 and transport the ordered food item(s) 126 to the location of the remote customer 114.

However, in other embodiments, the service provider 102 and/or the merchant 106 may proactively cause food items 126 of the merchant 106 to be prepared and transported to the different areas in anticipation of remote customers 114 wanting to order/consume those food items 126. For instance, the service provider 102 and/or the merchant 106 may identify food items 126 that are likely to be popular amongst customers 114 (e.g., based on prior orders 128), cause the merchant 106 to prepare or provide those food items 126, cause one or more deliverers 110 to transport the food items 126 to the different areas of the location 402 (e.g., the second area 406, the third area 408, and/or the fourth area 410) using food item containers 132 and/or delivery containers 134, and then offer the food items 126 to the remote customers 114. The remote customers 114 may obtain/acquire the food items 126 directly from the deliverer 110, such as via the deliverer device 112 of the deliverer 110. The remote customers 114 may also view which food items 126 are available at their area via customer devices 116, such as via a mobile application or web site associated with the service provider 102 or the merchant 106, and then purchase those food items 126. Upon purchasing one or more food items 126, the remote customers 114 may pick up the food item(s) 126 from the deliverer 110, a kiosk, a shelf, etc.

As discussed above with respect to FIG. 3, the service provider 102 and/or the merchant 106 may be aware of the inventory of food items 126 at each area, and may replenish food items 126 as the inventory of food items 126 at a particular area becomes low (e.g., at or below a threshold number). Upon determining that inventory is low, the service provider 102 and/or the merchant 106 may cause the deliverers 110 to pick up additional instances of the food items 126 and transport the food items 126 to the different areas. As a result, the service provider 102 and/or the merchant 106 may cause a certain amount of food items 126 to be present at each area of the location 402 such that remote customers 114 may order, purchase, and/or consume the food items 126. Accordingly, the location 402 may include only a single merchant 106 (e.g., a restaurant, a food truck, etc.) that is located in a single area of the location 402 (e.g., the first area 404), but the system 400 may allow the merchant 106 to offer food items 126 to remote customers 114 located in different areas of the location 402 (e.g., the second area 406, the third area 408, and/or the fourth area 410).

As an illustrative example, the location 402 may be an airport and each area may correspond to a different terminal at the airport. Provided that the merchant 106 is physically located in a first terminal, a customer 114 located in a different terminal may desire a food item 126 offered by the merchant 106 but may be unable (e.g., due to lack of time, distance between terminals, etc.) to travel to the first terminal. As a result, the service provider 102 may cause deliverers 110 to transport food items 126 prepared/provided by the merchant 106 to the different terminals of the airport. As a result, customers 114 that are not located in the first terminal at which the merchant 106 is physically located may still order, purchase, consume, etc., food items 126 provided/prepared by that merchant 106. The food item containers 132 and/or the delivery containers 134 described herein may cause the food items 126 to remain in an optimal or acceptable consumption state (e.g., not too cold/hot, not too dry/moist, etc.). Although an airport is discussed above, the location 402 may also correspond to a stadium (e.g., a sports stadium), a golf course, a convention center, a theme park, a fair, a mall, a festival, or any other location or venue in which customers 114 are located in different areas of the same location/venue.

In some embodiments, regardless of whether a customer 114 is located at the location 402 or at a different location, food items 126 may be delivered via the food item containers 132 and/or the delivery containers 134 to a specified location. For instance, the specified location may be a rack, shelf, locker, etc., associated with the customer 114 that is located at a residence (e.g., a condo/apartment building), a workplace (e.g., a lobby), an airport, a bus station, etc. That is, the specified location may be considered a delivery location for a customer 114 for ordered food items 126. The food items 126 may remain in the food item containers 132 and/or the delivery containers 134 until they are picked up by the customer 114. In some embodiments, the rack, shelf, locker, etc., may include components that are configured to maintain and/or adjust the conditions/characteristics (e.g., temperature, humidity, etc.) of the food items 126 prior to the customer 114 picking up the food items 126. As a result, food items 126 ordered by a customer 114 may be transported and delivered to a specified location associated with the customer 114 even though the customer 114 is not present at the time of delivery.

Food items 126 prepared/provided by merchants 106 may also be maintained in food item containers 132 and/or delivery containers 134 and offered to customers 114 in a transportation setting. For instance, food items 126 included in food item containers 132 and/or delivery containers 134 may be offered to customers 114 on an airplane or bus. The customers 114 may pre-order food items 126 from various merchants 106 (via a website/mobile application associated with the service provider 102) and the food items 126 may be maintained in an optimal consumption state until the customer 114 is ready to consume the food items 126. In other embodiments, the service provider 102 may determine/predict which food items 126 that customers 114 are likely to prefer and/or which merchants 106 the customers 114 are likely to want food items 126 from. Such food item 126 predictions may be based on an extent to which food items 126 have been ordered in the past. Then, when traveling, the customers 114 may be presented with options to purchase the food items 126 that are being maintained in the food item containers 132 and/or the delivery containers 134. That way, customers 114 are not limited to food items 126 that are typically offered (from an airline), and the airline may offer an expanded selection of food items 126 during travel.

In some embodiments, the food item containers 132 and/or the delivery containers 134 that contain the food items 126 may comprise a vending machine. More particularly, the service provider 102 may maintain and replenish fresh food items 126 prepared/provided by different merchants 106 in vending machines that are accessible by customers 114. The service provider 102 may stock/replenish the vending machines or cause one or more deliverers 110 to pick up food items 126 from merchants 106 and stock the vending machines. The vending machines may have one or more components that are configured to maintain and/or adjust the conditions/characteristics (e.g., temperature, humidity, etc.) of the food items 126, such as refrigeration components to keep the food items 126 cool/cold, heating elements to keep the food items 126 warm/hot, and/or humidifier/dehumidifier components to keep the food items 126 moist/dry. The food items 126 contained in the vending machines may be fully assembled and ready for consumption (e.g., a bean burrito) or may be partially or fully cooked by the components of the vending machine. Alternatively, or in addition, the vending machines may include ingredients that are assembled to create the food item 126 upon receiving a customer request to purchase the food item 126. For instance, the vending machines may include a hamburger bun, a hamburger patty, cheese, vegetables (e.g., lettuce, onions, tomato, etc.), and/or condiments (e.g., ketchup, mustard, mayonnaise, etc.) that are combined to create a cheeseburger. That way, the food item 126 would not become soggy, dry, stale, etc., and may instead be ready to be consumed when assembled.

The vending machine may be restocked with the same or different food items 126 as the inventory of food items 126 within the vending machines decrease. Moreover, the food items 126 included in the vending machines may vary/change based on the time of day (e.g., breakfast foods in the morning, sandwiches at lunch, etc.) and/or the time of year (e.g., cheeseburgers, corn, and watermelon during the summer, pumpkin pie around Thanksgiving, etc.). Customers 114 may order food items 126 that are ready for consumption from the vending machines, which may be located anywhere (e.g., a food court, an airport, a fair/festival, etc.). As a result, the vending machines may allow for increased convenience, variety, and selection for customers 114.

Figure 5:
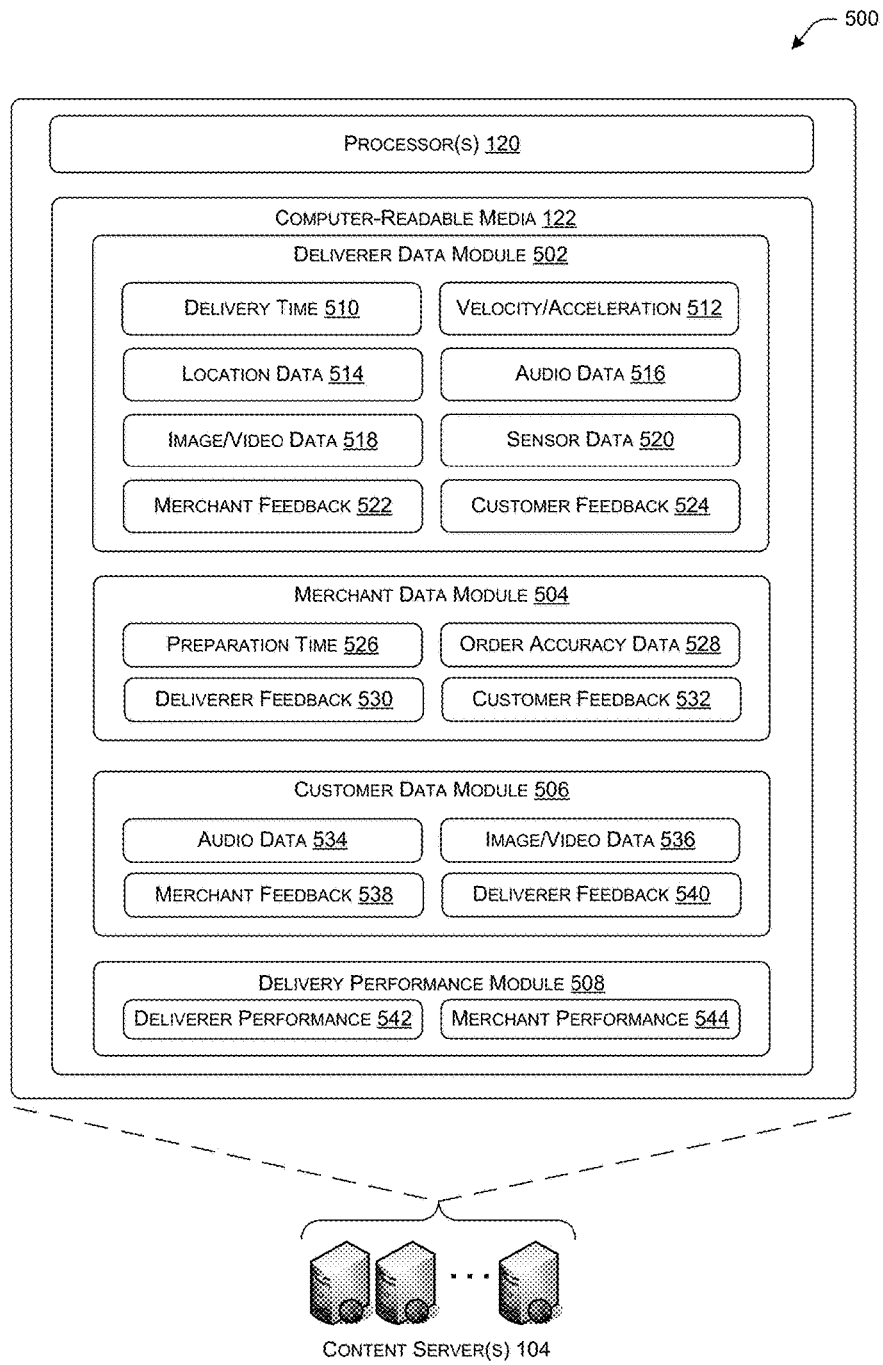
FIG. 5 illustrates an example system for determining the performance of merchants, deliverers, and/or customers with respect to the delivery of food items based on delivery data.

FIG. 5 illustrates an example system 500 for determining the performance of merchants and/or deliverers with respect to the delivery of food items based on delivery data. The system 500 may be directed to the content server(s) associated with the service provider, as discussed with respect to FIG. 1. As shown, the content server(s) 104 may include one or more processors 120, computer-readable media 122, and various modules. Although the content server(s) 104 may include any number and/or type of modules, the modules may include a deliverer data module 502, a merchant data module 504, a customer data module 506, and a delivery performance module 508.

With respect to the delivery of food items 126, customers 114 that receive the food items 126 might have a positive or negative experience. Provided that the service provider 102 facilitated the ordering and delivery of the food items 126, the service provider 102 may desire to determine what caused the customers 114 to have a positive/negative experience. As a result, the service provider 102 may collect and analyze various types of data relating to particular merchants 106 that prepared/provided the food items 126, individual deliverers 110 that transported the food items 126 from the location of the merchant 106 to the delivery location associated with customers 114, and/or the customers 114 that ordered, received, and/or consumed the food items 126. The data may be aggregated or may be specific to a particular merchant 106, deliverer 110, and/or customer 114. The service provider 102 may utilize the data to take actions with respect to the merchants 106, the deliverers 110, and/or the customers 114.

In various embodiments, the deliverer data module 502 may collect, obtain, and/or receive various types of data associated with deliverers 110 that transport ordered food items 126 from the location of the merchant 106 that provides/prepares the food items 126 to the delivery location of the customer 114 that ordered the food items 126. In particular, the deliverer data may include delivery time data 510 that indicates the amount of delivery time 510 for deliverers 110 that deliver food items 126 to customers 114. The delivery time data 510 may indicate an average delivery time 510 for different deliverers 110. The deliver time data 510 may indicate the delivery times 510 for different deliverers 110 for similar orders 128 to determine whether certain deliverers 110 are more efficient than other deliverers 110. The delivery time 510 may be based on the time at which the deliverer 110 is instructed to begin the delivery, the time that the deliverer 110 arrives at the merchant 106, the time that the deliverer 110 leaves the merchant 106 with the food item(s) 126, and/or the time at which the deliverer 110 arrives at the delivery location of the customer 114.

The deliverer data may also include velocity/acceleration data 512, which may indicate the velocity and/or acceleration in which deliverers 110 traveled during the delivery of a food item 126. The velocity/acceleration data 512 may be collected/obtained via deliverer devices 112, such as via a mobile application associated with the service provider 102, and/or sensors (e.g., motion sensor, accelerometer, etc.) associated with food item containers 132 and/or delivery containers 134 that include food items 126 being transported by deliverers 110. The velocity/acceleration data 512 may indicate how careful (or reckless) deliverers 110 were during food item deliveries. For instance, a velocity or acceleration above a threshold may indicate that a deliverer 110 started/stopped too fast, was traveling too fast around a corner, dropped or mishandled a food item container 132/delivery container 134, and so on. Significant increases/decreases in velocity/acceleration 512 may compromise the condition/quality of the food items 126 being delivered, including the aesthetics of the food items 126, which may result in a negative customer experience.

In certain embodiments, the deliverer data may include location data 514, which indicates previous locations of deliverers 110 before, during, and/or after deliveries of food items 126. The location data 514 may be collected, obtained, and/or received from the deliverer devices 112 of deliverers 110 (e.g., including mobile applications) and/or the sensors of the food item containers 132 and/or the delivery containers 134. The location data 514 indicates where deliverers 110 are, and where the deliverers 110 have been. For instance, the location data 514 may indicate a route taken by a deliverer 110 from a location of a merchant 106 that prepared/provided ordered food items 126 to a delivery location associated with the customer 114 that placed the order 128 for the food items 126. In some instances, the service provider 102 may determine if the route taken by the deliverer 110 is consistent with a quickest route and/or a route suggested/recommended by the service provider 102. The location data 514 may also indicate whether a deliverer 110 is following directions provided by the service provider 102 (e.g., directions to find a house, taking the food items 126 to the proper door/unit, etc.), whether the deliverer 110 is visiting unauthorized locations or is making stops (unauthorized or not) during a delivery, whether the deliverer 110 parks in close proximity to the delivery location, and so on. As a result, the location data 514 may indicate whether customer dissatisfaction was likely due to a deliverer 110 not adhering to instructions provided by the service provider 102.

The deliverer data may also include audio data 516 and/or image/video data 518. Deliverer devices 112, the food item containers 132, and/or the delivery containers 134 may include one or more microphones and/or one or more image capture devices (e.g., still image cameras, video cameras, etc.). The microphones may capture audio data 516 and the image capture devices may capture images/video that represent interactions between the deliverers 110 and the merchants 106, as well as interactions between the deliverers 110 and the customers 114. The microphones and image capture devices may continuously capture the audio data 516 and the image/video data 518 or the microphones/image capture devices may capture the audio data 516 and the image/video data 518 based on a triggering event, such as when instructions regarding a delivery order 128 are received by the deliverer 110 or when the deliverer 110 arrives at the location of the merchant 106 or the delivery location of the customer 114. In other embodiments, the microphone(s) may begin capturing the audio data 516 when a voice is detected, or when the microphone detects audio that is at or above a threshold decibel level. The image capture devices may be triggered and may begin capturing the image/video data 518 based on the triggering events noted directly above, or when the image capture devices detect motion.

In some embodiments, the audio data 516 captured by the microphones may be analyzed by the service provider 102. In some embodiments, the microphones may generate audio signals that represent the audio data 516, and the audio signals may be transmitted to the service provider 102. The service provider 102 may process the audio signals using automated speech recognition (ASR) techniques and/or natural language understanding (NLU) techniques in order to determine words or phrases captured by the microphones. The words or phrases may correspond to a conversation between one or more individuals of a merchant 106 that prepared/provided a food item 126 for delivery and a deliverer 110 that picked up the food item 126 from the merchant 106, or words uttered by merchant 106 and/or the deliverer 110. The words or phrases may also correspond to a conversation between a customer 114 that placed a delivery order 128 for food items 126 and a deliverer 110 that delivered the ordered food items 126 to the customer 114, or words uttered by the customer 114 and/or the deliverer 110. Such conversations may reveal the type of interactions (e.g., positive, negative, etc.) between the merchant 106/deliverer 110 and/or the customer 114/deliverer 110. Moreover, the audio data 516 may indicate instances of verbal abuse, use of profanity, undesirable tone, inappropriate volume levels, and other verbal interactions that are inappropriate from the perspective of the service provider 102.

The image/video data 518 may also indicate interactions between the deliverer 110, the merchant 106, and/or the customer 114. As with the audio data 516, the image/video data 518 may depict instances of verbal abuse, use of profanity, undesirable tone, inappropriate volume levels, physical abuse/violence, in appropriate gestures, erratic driving behavior, inappropriate/unsanitary interactions with the food items 126, and other behavior that are inappropriate from the perspective of the service provider 102. The image video data 518 and/or the audio data 516 may also indicate instances in which a deliverer 110 is interacting in a pleasant/expected manner with respect to the merchant 106 and/or the customer 114, and instances in which the deliverer 110 is delivering food items 126 pursuant to instructions provided by the service provider 102.

The deliverer data may also include sensor data 520, which may correspond to various types of data obtained by sensors of a deliverer device 112 and/or sensors of a food item container 132 and/or a delivery container 134 that is being used by the deliverer 110 to transport food items 126. For instance, the sensor data 520 may indicate conditions/ characteristics (e.g., temperature, humidity, etc.) of the food items 126 and/or the environment within the food item containers 132/delivery containers 134, as well as adjustments to the food item containers 132/delivery containers 134 made by the deliverer 110. Such adjustments may include the deliverer 110 adjusting one or more characteristics associated with the food item containers 132/delivery containers 134, such as increasing/decreasing the temperature.

The deliverer data may also include merchant feedback 522 and customer feedback 524. The merchant feedback 522 may correspond to feedback from merchants 106 regarding the deliverer 110 that picked up food items 126 prepared/ provided by the merchant 106 for delivery. For instance, the merchant feedback 522 may be provided to the service provider 102 via an e-mail message, a text message, a web site, a mobile application, etc., and may indicate whether the merchant 106 had a positive, negative, or neutral experience with the deliverer 110. More particularly, the merchant feedback 522 may indicate whether the deliverer 110 was on time, whether the deliverer 110 behaved appropriately, whether the deliverer 110 picked up food items 126 associated with the correct order 128, and so on. The customer feedback 524 may correspond to feedback from customers 114 regarding the deliverer 110 that delivered ordered food items 126 to the delivery location of the customer 114. For instance, the customer feedback 524 may be provided to the service provider 102 via an e-mail message, a text message, a website, a mobile application, etc., and may indicate whether the customer 114 had a positive, negative, or neutral experience with the deliverer 110. More particularly, the customer feedback 524 may indicate whether the deliverer 110 was on time, whether the deliverer 110 behaved appropriately, whether the deliverer 110 delivered the correct food items 126, and so on.

The merchant data module 504 may collect, obtain, receive, etc. data associated with merchants 106 that prepared/provided food items 126 for delivery to customers 114. For instance, the merchant data may include preparation time data 526, which may indicate an amount of time it took merchants 106 to prepare food items 126 that are to be delivered to customers 114. The preparation time 526 for a food item 126 may indicate an amount of time that begins at a first time at which the merchant 106 received, from the service provider 102, instructions to prepare/provide a food item 126 for delivery and that ends at a second time at which the food item(s) 126 are available and ready for pick up by a deliverer 110. For instance, the second time may correspond to when the food items 126 are included in a food item container 132 and/or a delivery container 134. The preparation time data 526 may also indicate an extent to which the food items 126 to be prepared by merchants 106 are ready for delivery at the time specified by the service provider 102. As a result, the preparation time data 526 may indicate a ratio or percentage that corresponds to the extent to which food items 126 are prepared on time. When determining the preparation time 526 for a particular merchant 106, the service provider 102 may also consider the number of orders 528 being handled by the merchant 106 at that particular time. For instance, a longer preparation time 526 for a merchant 106 may be reasonable if that merchant 106 has received a large amount of orders 128 for dine-in, take-out, and/or delivery.

The merchant data may also include order accuracy data 528. The order accuracy data 528 may indicate an extent to which merchants 106 prepared/provided the correct food items 126 that were actually ordered by customers 114. For instance, upon receiving a delivery order 128 for food items 126, the service provider 102 may send order data 130 to the merchant 106 that is to prepare/provide the ordered food items 126, where the order data 130 may identify the food items 126 that the merchant 106 is to prepare/provide and any preferences provided by the customer 114. In some instances, the merchant 106 may prepare/provide the correct food items 126 that were included in the order 128 placed by the customer 114. However, in other embodiments, the merchant 106 may make an error with respect to the order 128. For instance, with respect to an order 128 for one or more food items 126, the customer 114 may omit a food item 126 that was included in the order 128, prepare one of the food items 126 incorrectly (e.g., missing an ingredient, not consistent with a customer preference, etc.), include a food item 126 not included in the order 128, and so on. The order accuracy data 528 may indicate an extent to which the merchants 106 provided/prepared food items 126 that are consistent with the order 128. In certain embodiments, the order accuracy data 528 may also indicate the extent to which the merchants 106 placed food items 126 into food item containers 132 and/or delivery containers 134 at an expected, minimum, and/or maximum temperature, and the extent to which the merchants 106 had to further prepare the food items 126 in the event that the food items 126 were not prepared to their expected, minimum, and/or maximum temperature.

The order accuracy data 528 may also indicate an extent to which deliverers 110 delivered the correct food items 126 that were actually included in an order 128. For instance, a deliverer 110 may have picked up the correct food items 126 from the merchant 106, and delivered the correct food items 126 to the correct delivery location. However, the deliverer 110 may have picked up the correct food items 126 from the merchant 106, but then delivered the food items 126 to an incorrect location (e.g., a location other than the delivery location of the customer 114 that placed the order 128). Moreover, the deliverer 110 may have only picked up a portion of an order 128 (e.g., picked up a first food item 126 included in the order 128, but not a second food item 126 included in the order 128), and therefore delivered an incomplete order 128 to the customer 114. The order accuracy data 528 may also indicate that the deliverer 110 picked up incorrect food items 126 from the merchant 106 and, as a result, delivered the wrong food items 126 to the customer 114. Accordingly, the order accuracy data 528 may indicate a ratio/percentage of orders 128 that were properly (or improperly) delivered to customers 114.

The merchant data may also include deliverer feedback 530 and customer feedback 532. The deliverer feedback 530 may correspond to feedback from deliverers 110 regarding the merchant 106 that prepared/provided the food items 126 for delivery. For instance, the deliverer feedback 530 may be provided to the service provider 102 via an e-mail message, a text message, a website, a mobile application, etc., and may indicate whether the deliverer 110 had a positive, negative, or neutral experience with the merchant 106. More particularly, the deliverer feedback 530 may indicate whether the merchant 106 provided/prepared the food items 126 on time for delivery, whether the merchant 106 behaved appropriately, whether the merchant 106 prepared/provided the correct food items 126 that were consistent with the order 128, and so on. The customer feedback 532 may correspond to feedback from customers 114 regarding the merchant 106 that prepared the food items 126 for delivery. For instance, the customer feedback 532 may be provided to the service provider 102 via an e-mail message, a text message, a website, a mobile application, etc., and may indicate whether the customer 114 had a positive, negative, or neutral experience with the merchant 106. More particularly, the customer feedback 532 may indicate whether the deliverer 110 was on time, which may indicate whether the merchant 106 prepared/provided the food items 126 to the deliverer 110 on time, whether the merchant 106 behaved appropriately, whether the deliverer 110 delivered the correct food items 126, whether the food items 126 met the expectations of the customer 114 (e.g., very good, too warm/cold, too soggy/dry, etc.), and so on.

The customer data module 506 may collect, obtain, receive, etc. data associated with customers 114 that placed orders 128 (from the service provider 102) for the delivery of food items 126. The customer data may include audio data 534 and image/video data 536. The audio data 534 and the image/video data 536 may indicate interactions between the customer 114 and at least one of the merchant 106 that prepared/provided the food items 126 for delivery or the deliverer 110 that actually delivered the ordered food items 126 to the delivery location of the customer 114. The audio data 534 and/or the image/video data 536 may depict instances of verbal abuse, use of profanity, undesirable tone, inappropriate volume levels, physical abuse/violence, in appropriate gestures, and other behavior performed by the customer 114 that are inappropriate from the perspective of the service provider 102. The audio data 534 and/or the image/video data 536 may depict behavior of the customer 114 while the customer 114 is placing an order 128 for the delivery of one or more food items 126, as well as the behavior of the customer 114 when the deliverer 110 delivers the food items 126 to the customer 114. In some embodiments, the audio data 534 and/or the image/video data 536 may depict behavior of the customer 114 with respect to the service provider 102. Although not shown in FIG. 5, audio data and/or image video may also depict behavior of the merchant 106 (or individuals of the merchant 106) with respect to the service provider 102, the deliverers 110, and/or the customers 114.

Alternatively, or in addition to, audio data (e.g., audio data 516 and/or audio data 534) and image/video data (e.g., image/video data 518 and/or image/video data 536), the service provider 102 may determine text data associated with the merchants 106, the deliverers 110, and/or the customers 114. The text data may correspond to any written communication between the merchants 106, the deliverers 110, and/or the customers 114, such as e-mail messages, text/SMS messages, online chats, facsimile (fax) messages, transcribed audio messages (e.g., transcribed audio recordings, voicemails, etc.), and so on. The text data may also indicate interactions between the merchants 106, the deliverers 110, and/or the customers 114, and may indicate a behavior, and an appropriateness thereof, of the merchants 106, the deliverers 110, and/or the customers 114. Accordingly, the text data may be used to determine the performance of the merchants 106, the deliverers 110, and/or the customers 114.

The customer data may also include merchant feedback 538 and deliverer feedback 540. The merchant feedback 538 may correspond to feedback from merchants 106 regarding the customer 114 that placed the order 128 for the delivery of food items 126 to be provided/prepared by the merchant 106. For instance, the merchant feedback 538 may be provided to the service provider 102 via an e-mail message, a text message, a website, a mobile application, etc., and may indicate whether the merchant 106 had a positive, negative, or neutral experience with the customer 114. More particularly, the merchant feedback 538 may indicate whether the customer 114 behaved appropriately if the customer 114 ordered the food items 126 directly from the merchant 106. The deliverer feedback 540 may correspond to feedback from deliverers 110 regarding the customer 114 that placed the delivery order 128 for the food items 126 delivered by the deliverer 110. For instance, the deliverer feedback 540 may be provided to the service provider 102 via an e-mail message, a text message, a website, a mobile application, etc., and may indicate whether the deliverer 110 had a positive, negative, or neutral experience with the customer 114. More particularly, the deliverer feedback 540 may indicate whether the customer 114 behaved appropriately when the deliverer 110 delivered the ordered food items 126 to the delivery location of the customer 114.

Based on the deliverer data and the merchant data described above, the delivery performance module 508 may determine a deliverer performance 542 of various deliverers 110 and a merchant performance 544 of various merchants 106. Moreover, based on the deliverer performance 542 and the merchant performance 544, the service provider 102 may take one or more actions with respect to the merchants 106, the deliverers 110, and/or the customers 114. For instance, based on the deliverer performance 542 of a particular deliverer 110, and provided that the deliverer performance 542 of the deliverer 110 is positive, the service provider 102 may make that deliverer 110 a preferred deliverer 110, may request that the deliverer 110 deliver food items 126 more frequently, provide more favorable rates for that deliverer 110, request the deliverer 110 for larger orders 128, and so on. However, if the deliverer performance 542 is instead negative, the service provider 102 may cease requesting that deliverer 110 for delivery orders 128, request that deliverer 110 less frequently, provide less favorable rates to that deliverer 110, and so on.

Provided that the merchant performance 544 for a particular merchant 106 is positive, the service provider 102 may make that merchant 106 a preferred merchant 106, display that merchant 106 more prominently on the web site/mobile application in which customers 114 search for, and order, food items 126 for delivery, cause the merchant 106 to be ranked higher in response to customer searches for food items 126, identify that merchant 106 for larger, and possibly more profitable, food item orders 128, provide more favorable rates to that merchant 106, and so on. However, if the merchant performance 544 is determined to be negative, the service provider 102 may remove that merchant 106 as a preferred merchant 106, provide less favorable rates for that merchant 106, display that merchant 106 less prominently on the website/mobile application, and/or determine that the merchant 106 is no longer eligible for delivery orders 128.

Based on the customer data, the service provider 102 may provide more/less favorable rates to the customer 114, provide deals/discounts for food items 126, provide free or discounted delivery of food items 126, offer quicker delivery times, make the customer 114 a preferred customer 114, and in instances in which the customer performance is negative, possibly cause that customer 114 to no longer be eligible for delivery orders 128 for food items 126.

In some embodiments, the deliverer performance 542 and/or the merchant performance 544 (as well as the performance of the customers 114) may be represented by a value, such as a numerical value (e.g., a numerical value between 1 and 10). The performance of the merchants 106, the deliverers 110, and the customers 114 may also be represented/characterized by other levels, categories, indicators, and/or descriptions, such as the behavior being excellent, good, satisfactory, and/or unsatisfactory.

FIGS. 6-9 illustrate example processes for facilitating the preparation and delivery of food items using sophisticated food item containers and/or delivery containers. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Figure 6:
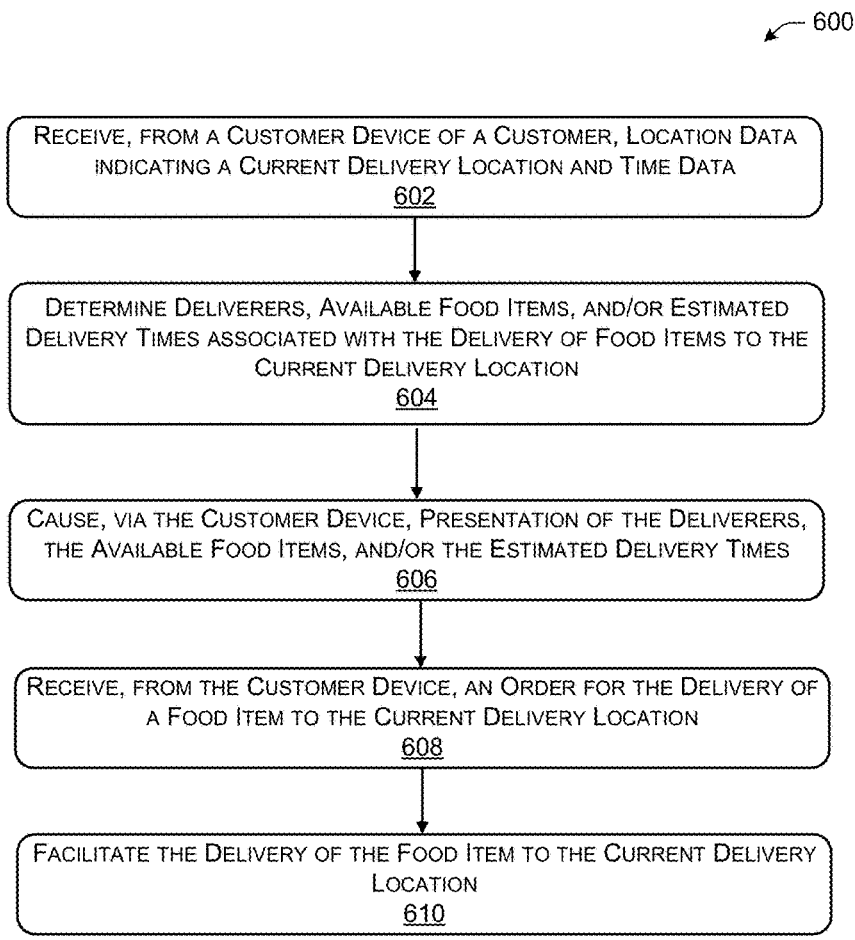
FIG. 6 is a flow diagram illustrating an example process of facilitating the delivery of food items to a customer based on a current delivery location of the customer using intelligent delivery/food item containers.

FIG. 6 illustrates a flow diagram of an example process 600 of facilitating the delivery of food items to a customer based on a current delivery location of the customer using intelligent delivery/food item containers. Moreover, the following actions described with respect to FIG. 6 may be performed by the service provider 102, the content server(s) 104, the merchants 106, and/or the merchant devices 108, as illustrated with respect to FIGS. 1-5.

Block 602 illustrates receiving, from a customer device of a customer, location data indicating a current delivery location and time data. In various embodiments, a customer 114 would like to receive the delivery of food items 126 at their current location in a short amount of time (e.g., 5 minutes, 10 minutes, etc.). To do so, via a mobile application or website associated with the service provider 102, the customer 114 may indicate his/her current location, or the location associated with the customer 114 may be otherwise obtained by the service provider 102. In addition to indicating a current delivery location, the customer 114 may indicate time data, which may correspond to a time or time period at which the customer 114 would like delivery of one or more food items 126. For instance, the customer 114 may indicate that he/she would like to receive the food item(s) 126 at a particular time (e.g., 6:00 pm), during a period of time (e.g., 5:00-7:00 pm), not before a particular time (e.g., not before 6:00 pm), not after a particular time (e.g., not after 6:00 pm), a particular amount of time after placing an order 128 (e.g., 30 minutes), and so on.

Block 604 illustrates determining deliverers, available food items, and/or estimated delivery times associated with the delivery of food items to the current delivery location. Upon determining the current location of the customer 114, the service provider 102 may determine deliverers 110 that are currently transporting food items 126 (within sophisticated food item containers 132 and/or delivery containers 134) that could be delivered to the customer 114. The service provider 102 may also determine merchants 106 that are capable of preparing/providing food items 126 that could be delivered to the current location of the customers 114 by deliverers 110. The service provider 102 may also identify food items 126 for delivery to the current location of the customer 114 based on estimated delivery times associated with the delivery of those food items 126.

Block 606 illustrates causing, via the customer device, presentation of the deliverers, available food items, and/or estimated delivery times. Upon identifying the information described above with respect to block 604, the service provider 102 may cause this information to be presented to the customer 114 via his/her customer device 116, such as visually displaying the information via a display of the customer device 116 and/or audibly outputting the information via one or more speakers of the customer device 116.

Block 608 illustrates receiving, from the customer device, an order for the delivery of a food item to the current delivery location. The customer 114 may elect to order one or more food items 126 for delivery to the current location of the customer 114 or a different location.

Block 610 illustrates facilitating the delivery of the food item to the current delivery location. Upon receiving an order 128 for food items 126 for delivery, the service provider 102 may send one or more instructions to one or more merchants 106 to prepare/provide the ordered food items 126 and/or to one or more deliverers 110 to transport the ordered food items 126 to the delivery location of the customer 114, which may be his/her current location.

Figure 7:
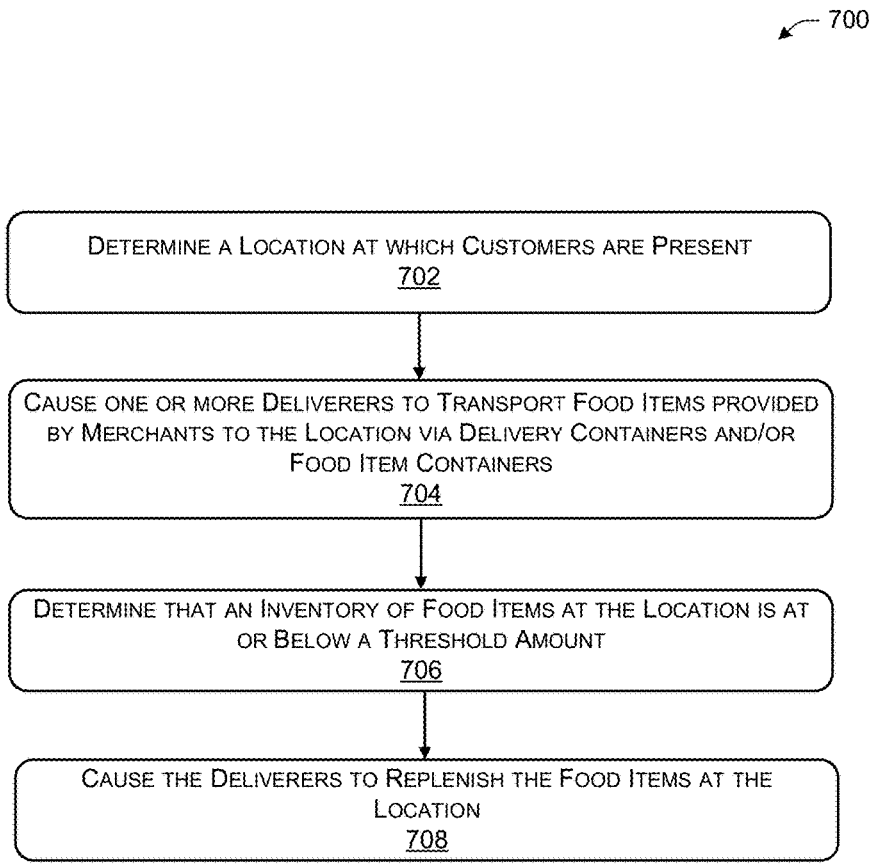
FIG. 7 is a flow diagram illustrating an example process of facilitating the offering of food items at a location that is remote from merchants that provide the food items using intelligent delivery/food item containers.

FIG. 7 illustrates a flow diagram of an example process 700 of facilitating the offering of food items at a location that is remote from merchants that provide the food items using intelligent delivery/food item containers. Moreover, the following actions described with respect to FIG. 7 may be performed by the service provider 102, the content server(s) 104, the merchants 106, and/or the merchant devices 108, as illustrated with respect to FIGS. 1-5.

Block 702 illustrates determining a location at which customers are present. In various embodiments, the service provider 102 may determine a location 304 (e.g., a park, a fair, a stadium, etc.) in which a large number of customers 114 (e.g., a threshold number/amount of customers 114) may be present. As a result, the service provider 102 may determine that such customers 114 at the location 304 would likely desire to obtain food items 126 for consumption.

Block 704 illustrates causing one or more deliverers to transport food items provided by merchants to the location via delivery containers and/or food item containers. The service provider 102 may send instructions for merchants 106 to prepare/provide food items 126 and may send instructions for deliverers 110 to pick up the food items 126 from locations of the merchants 106 and transport the food items 126 to the location 304 using sophisticated/intelligent food item containers 132 and/or delivery containers 134. Customers 114 at the location 304 may order and/or pick up the food items 126, such as by purchasing the food items 126 located at the location 304 using a mobile application or website associated with the service provider 102.

Block 706 illustrates determining that an inventory of food items at the location is at or below a threshold amount. After causing the food items 126 to be transported to the location 304, and since the service provider 102 may be aware of the food items 126 transported to the location 304 and the food items 126 that have been ordered/purchased at the location 304, the service provider 102 may determine that a total number of food items 126 or that a number of specific type of food items 126 is low.

Block 708 illustrates causing the deliverers to replenish the food items at the location. Upon determining that an inventory of food items 126 at the location 304 is low, the service provider 102 may cause deliverers 110 that are currently transporting the food items 126 to deliver the food items 126 to the location 304. The service provider 102 may also instruct merchants 106 to prepare additional food items 126 and for deliverers 110 to pick up those additional food items 126 and deliver them to the location 304.

Figure 8:
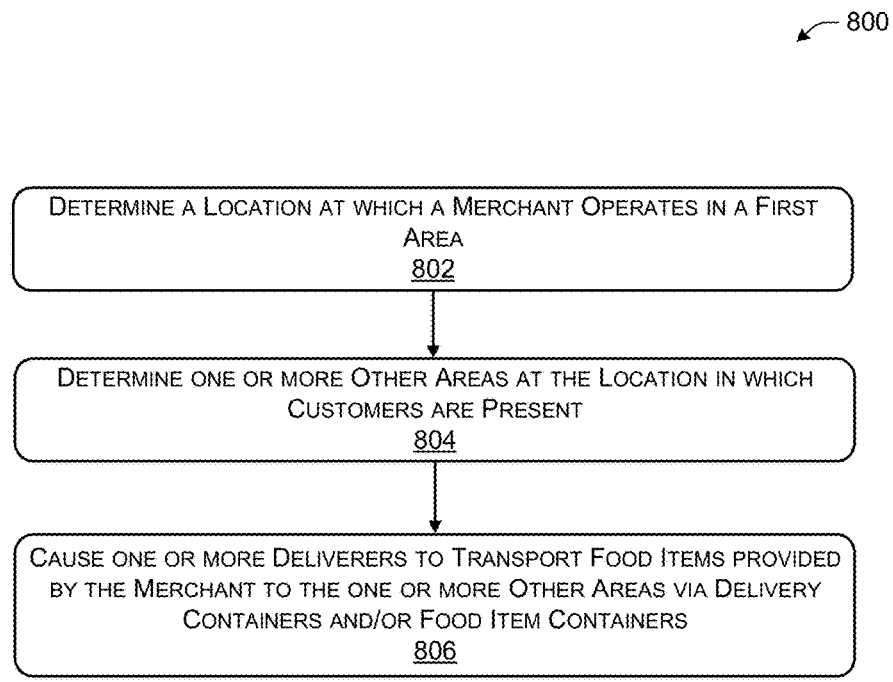
FIG. 8 is a flow diagram illustrating an example process of facilitating the offering of food items in different areas of a location at which the merchant that provides the food items is not present using intelligent delivery/food item containers.

FIG. 8 illustrates a flow diagram of an example process 800 of facilitating the offering of food items in different areas of a location at which the merchant that provides the food items is not present using intelligent delivery/food item containers. Moreover, the following actions described with respect to FIG. 8 may be performed by the service provider 102, the content server(s) 104, the merchants 106, and/or the merchant devices 108, as illustrated with respect to FIGS. 1-5.

Block 802 illustrates determining a location at which a merchant operates in a first area. Some locations 402 may have multiple different areas at which customers 114 are present, such as an airport having multiple terminals, a fairground, a stadium, and so on. In some embodiments, a merchant 106 may be physically located in a first area 404, but may want to offer its food items 126 to customers 114 in different areas (e.g., a second area 406, a third area 408, a fourth area 410, etc.). However, customers 114 in the different areas may not be able to travel to the location of the merchant 106 to order food items 126 (e.g., due to inconvenience, lack of time, lack of energy, etc.).

Block 804 illustrates determining one or more other areas at the location in which customers are present. As stated above, the service provider 102 may determine that different areas of the location 402 may include customers 114 that are likely interested in ordering food items 126 from the merchant 106.

Block 806 illustrates causing one or more deliverers to transport food items provided by the merchant to the one or more other areas via delivery containers and/or food item containers. In order to allow the customers 114 in the different areas of the location 402 to consume food items 126 provided/prepared by the merchant 106, the service provider 102 may cause deliverers 110 to transport the food items 126 to the different areas via sophisticated/intelligent food item containers 132 and/or delivery containers 134 that are capable of maintaining and/or adjusting the characteristics/conditions of the food items 126 and/or the environment in which the food items 126 are contained. That way, customers 114 are able to order/purchase the food items 126 of the merchant 106 even though they are remotely located.

Figure 9:
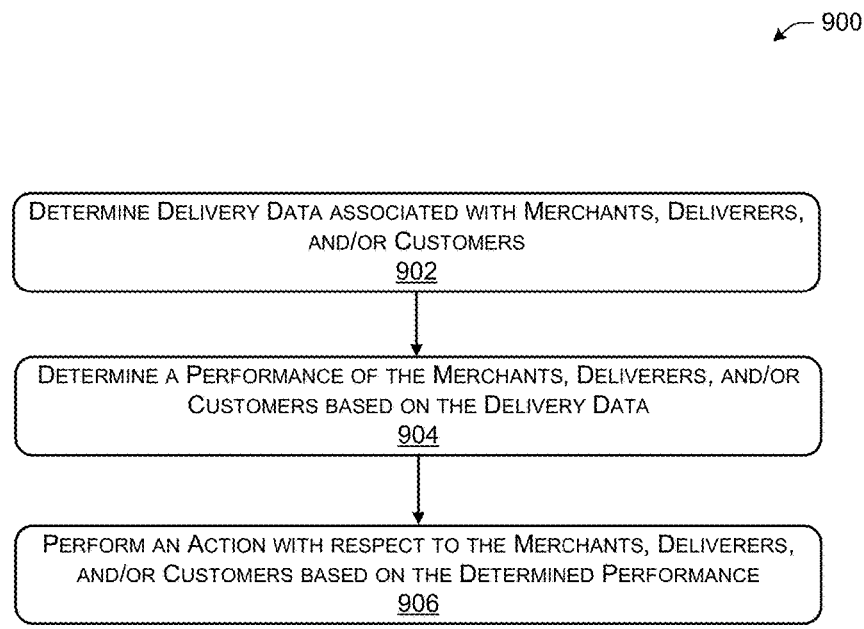
FIG. 9 is a flow diagram illustrating an example process of determining the performance of merchants, deliverers, and/or customers with respect to the delivery of food items based on delivery data.

FIG. 9 illustrates a flow diagram of an example process 900 of determining the performance of merchants and/or deliverers with respect to the delivery of food items based on delivery data. Moreover, the following actions described with respect to FIG. 9 may be performed by the service provider 102, the content server(s) 104, the merchants 106, and/or the merchant devices 108, as illustrated with respect to FIGS. 1-5.

Block 902 illustrates determining delivery data associated with merchants, deliverers, and/or customers. In various embodiments, the service provider 102 may determine data regarding the preparation of food items 126 by merchants 106 for delivery, data regarding deliverers 110 picking up the ordered food items 126 from locations of merchants 106 and transporting the ordered food items 126 to delivery locations of customers 114, and data regarding customers 114 that placed orders 128 for the delivery of food items 126 and received the ordered food items 126 from deliverers 110.

Block 904 illustrates determining a performance of the merchants, deliverers, and/or customers based on the delivery data. Based on the data described with respect to block 902, the service provider 102 may determine whether the performance of the merchants 106, the deliverers 110, and/or the customers 114 was positive, negative, or neutral.

Block 906 illustrates performing an action with respect to the merchants, deliverers, and/or customers based on the determined performance. In various embodiments, based on the performance identified in block 904, the service provider 102 may take one or more actions with respect to the merchants 106, the deliverers 110, and/or the customers 114.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   memory;
   one or more processors; and
   one or more computer-executable instructions stored in the memory and executable by the one or more processors to perform operations comprising:
      receiving, via a mobile application that is associated with a service provider and that resides on a customer device of a customer, a current geographic location of the customer device and a maximum amount of time for a delivery of food items to the current geographic location;
      identifying a plurality of food items that are available to be delivered to the current geographic location within the maximum amount of time, the plurality of food items including:
         first food items currently being transported by at least one first deliverer within at least one of food item containers or delivery containers that include at least one component that is configured to maintain and adjust a first temperature of the first food items; and
         second food items that are to be provided by restaurant merchants and that are to be transported by at least one second deliverer;
      displaying, via the mobile application, the plurality of food items and estimated delivery times associated with each of the plurality of food items;
      receiving, via the mobile application and from the customer, a selection of one or more food items of the plurality of food items, the selection indicating an order for the one or more food items to be delivered to the current geographic location; and
      facilitating the delivery of the one or more food items to the current geographic location by transmitting an instruction to transport the one or more food items to the current geographic location using at least one of a food item container or a delivery container that are each configured to maintain and adjust a second temperature of the one or more food items.

2. The system as recited in claim 1, wherein the operations further comprise:
   determining a first inventory of food items currently being transported by a first deliverer within at least one of one or more first food item containers or one or more first delivery containers;
   determining a second inventory of food items currently being transported by a second deliverer within at least one of one or more second food item containers or one or more second delivery containers; and
   identifying the plurality of food items based on the first inventory of food items and the second inventory of food items.

3. The system as recited in claim 1, wherein the one or more food items include a first food item and a second food item, and wherein facilitating the delivery of the one or more food items to the current geographic location comprises:
   transmitting, to a first deliverer device of a first deliverer, a first instruction to transport the first food item to the current geographic location, the first food item being currently transported by the first deliverer or being obtained by the first deliverer from a first location of a first restaurant merchant; and
   transmitting, to a second deliverer device of a second deliverer, a second instruction to transport the second food item to the current geographic location, the second food item being currently transported by the second deliverer or being obtained by the second deliverer from a second location of a second restaurant merchant.

4. The system as recited in claim 1, wherein the one or more food items include a first food item and a second food item, and wherein facilitating the delivery of the one or more food items to the current geographic location comprises:
   transmitting, to a first deliverer device of a first deliverer, a first instruction to transport the first food item and the second food item to the current geographic location; and
   transmitting, to a second deliverer device of a second deliverer, a second instruction to transfer at least one of the first food item or the second food item to the first deliverer.

5. The system as recited in claim 1, wherein the current geographic location and the maximum amount of time are received at a first time, and wherein the operations further comprise:
   receiving, via the mobile application, an indication that at least one food item of the one or more food items is to be consumed at a second time that is subsequent to an expiration of the maximum amount of time; and causing the at least one of the food item container or the delivery container to adjust the second temperature of the one or more food items.

6. A method comprising:
   determining a location received from a customer device associated with a customer;
   determining a preferred amount of time for a food item delivery to the location;
   causing, via the customer device, presentation of one or more food items that are available to be delivered to the location within the preferred amount of time;
   receiving, from the customer device, a selection of a food item of the one or more food items; and
   facilitating a delivery of the food item to the location using at least one of a food item container or a delivery container that includes at least one component that is configured to maintain and adjust a characteristic of the food item during the delivery.

7. The method as recited in claim 6, further comprising determining that the one or more food items are at least one of currently being transported by one or more deliverers or are to be provided by one or more merchants.

8. The method as recited in claim 6, wherein the location is input by the customer via a mobile application that resides on the customer device and that is associated with a service provider.

9. The method as recited in claim 6, wherein, prior to receiving the selection, the food item is currently being transported by a deliverer via the at least one of the food item container or the delivery container, and wherein facilitating the delivery of the food item to the location comprises transmitting, to a deliver device of the deliverer, an instruction to transport the food item to the location.

10. The method as recited in claim 6, wherein facilitating the delivery of the food item to the location comprises:
    transmitting, to a merchant device of a merchant, a first instruction to prepare or provide the food item; and
    transmitting, to a deliverer device of a deliverer, a second instruction to pick up the food item from a second location of the merchant and transport the food item to the location.

11. The method as recited in claim 6, further comprising:
    determining a first inventory of food items currently being transported by a first deliverer within at least one of a first food item container or a first delivery container;
    determining a second inventory of food items currently being transported by a second deliverer within at least one of a second food item container or a second delivery container; and
    identifying the one or more food items based at least partly on the first inventory of food items and the second inventory of food items.

12. The method as recited in claim 6, further comprising:
    receiving, from the customer device, an indication that at least a portion of the food item is to be consumed at a particular time; and
    causing the at least one of the food item container or the delivery container to adjust the characteristic of the food item.

13. The method as recited in claim 6, further comprising:
    determining, based at least partly on first sensor data obtained by a sensor of the food item container at a first time, a first weight of the food item prior to consumption of the food item by the customer;
    determining, based at least partly on second sensor data obtained by the sensor of the food item container at a second time that is subsequent to the first time, a second weight of the food item;
    determining that the second weight is less than the first weight; and
    determining a food item consumption preference of the customer.

14. The method as recited in claim 6, wherein facilitating the delivery of the food item to the location comprises:
    causing a first deliverer to transport the food item to the location; and
    causing a second deliverer to transport a second food item ordered by the customer to the location.

15. The method as recited in claim 6, wherein facilitating the delivery of the food item to the location comprises:
    causing a first deliverer to transport the food item and a second food item ordered by the customer to the location and
    causing a second deliverer to transfer at least one of the food item or the second food item to the first deliverer.

16. A system comprising:
    memory;
    one or more processors; and
    one or more computer-executable instructions stored in the memory and executable by the one or more processors to perform operations comprising:
      determining a location received from a customer device associated with a customer;
      determining a preferred amount of time for a food item delivery to the location;
      determining an inventory of food items currently being transported by a deliverer within at least one of a food item container or a delivery container;
      causing, via the customer device, presentation of one or more food items that are available to be delivered to the location within the preferred amount of time, at least one food item of the one or more food items being included in the inventory of food items;
      receiving, from the customer device, a selection of a food item of the one or more food items; and
      facilitating a delivery of the food item to the location.

17. The system as recited in claim 16, wherein the food item is delivered to the location using at least one of one or more food item containers or one or more delivery containers that are configured to maintain and adjust a characteristic of the food item during the delivery, the characteristic including at least one of a temperature, a humidity, a pressure, or an orientation associated with the food item.

18. The system as recited in claim 16, wherein the location is determined via a mobile application that resides on the customer device and that is associated with a service provider, and the preferred amount of time corresponds to a maximum amount of time for the food item delivery.

19. The system as recited in claim 16, wherein the food item is currently being transported by the deliverer via the at least one of the food item container or the delivery container, and wherein facilitating the delivery of the food item to the location comprises transmitting, to a deliver device of the deliverer, an instruction to transport the food item to the location.

20. The system as recited in claim 16, wherein facilitating the delivery of the food item to the location comprises:
    transmitting, to a merchant device of a merchant, a first instruction to prepare or provide the food item; and
    transmitting, to a deliverer device of the deliverer or a second deliverer, a second instruction to pick up the food item from a second location of the merchant and transport the food item to the location.

21. The system as recited in claim 16, wherein the operations further comprise:
   determining a second preferred amount of time for the food item delivery to the location, the second preferred amount of time being different than the preferred amount of time;
   determining one or more second food items that are available to be delivered to the location within the second preferred amount of time; and
   causing, via the customer device, presentation of the one or more second food items.

\* \* \* \* \*